United States Patent
Whitten et al.

(10) Patent No.: US 11,840,952 B2
(45) Date of Patent: Dec. 12, 2023

(54) DOSING CONDUIT ARRANGEMENTS FOR EXHAUST AFTERTREATMENT SYSTEM

(71) Applicant: Donaldson Company, Inc., Broomington, MN (US)

(72) Inventors: Matthew S. Whitten, St. Paul, MN (US); Todd R. Taubert, St. Paul, MN (US); Derek M. Larsen, Mound, MN (US); Korneel De Rudder, Herent (BE); Mark Thomas Brandl, Ham Lake, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 17/626,336

(22) PCT Filed: Jun. 30, 2020

(86) PCT No.: PCT/US2020/040264
§ 371 (c)(1),
(2) Date: Jan. 11, 2022

(87) PCT Pub. No.: WO2021/007069
PCT Pub. Date: Jan. 14, 2021

(65) Prior Publication Data
US 2022/0268192 A1 Aug. 25, 2022

Related U.S. Application Data

(60) Provisional application No. 62/872,780, filed on Jul. 11, 2019.

(51) Int. Cl.
*F01N 3/20* (2006.01)
*F01N 3/28* (2006.01)
*F01N 13/08* (2010.01)

(52) U.S. Cl.
CPC ............... *F01N 3/206* (2013.01); *F01N 3/28* (2013.01); *F01N 13/08* (2013.01)

(58) Field of Classification Search
CPC .. F01N 13/08; F01N 2240/20; F01N 2470/02; F01N 2610/02; F01N 2610/1453; F01N 3/2892
See application file for complete search history.

(56) References Cited

U.S. PATENT DOCUMENTS 8,079,211 B2    12/2011  Levin et al.
8,302,391 B2    11/2012  Wirth et al.
(Continued)

FOREIGN PATENT DOCUMENTS

CN    108397262 A1    8/2018
DE    102016117900 A1    3/2017
(Continued)

OTHER PUBLICATIONS

English Translation DE102017101749A1 (Year: 2017).*
(Continued)

*Primary Examiner* — Anthony Ayala Delgado
(74) *Attorney, Agent, or Firm* — Merchant & Gould P.C.

(57) ABSTRACT

An aftertreatment device includes flow guides disposed within a dosing conduit. Exhaust enters through a perforated region of the dosing conduit and passes through the flow guides. The flow guides induce swirling or other turbulence to mix injected reactant with the exhaust gas. Various types of flow guides include cantilevered vanes, guide passageways, and louvered openings of a second conduit. Some types of flow guides induce localized mixing to inhibit deposit formation at the doser mounting unit. Other types of flow guides induce mixing downstream of the dosing conduit.

20 Claims, 16 Drawing Sheets

(56) References Cited

U.S. PATENT DOCUMENTS

| | | |
|---|---|---|
| 8,454,897 B2 | 6/2013 | Wirth et al. |
| 8,495,866 B2 | 7/2013 | Wirth |
| 8,511,076 B2 | 8/2013 | Wirth |
| 8,596,044 B2 | 12/2013 | Werni et al. |
| 8,800,276 B2 | 8/2014 | Levin et al. |
| 9,243,544 B2 | 1/2016 | Többen et al. |
| 9,266,075 B2 | 2/2016 | Chapman et al. |
| 9,289,724 B2 | 3/2016 | Stanavich et al. |
| 9,364,790 B2 | 6/2016 | Sampath et al. |
| 9,410,460 B2 | 8/2016 | Hackländer |
| 9,410,464 B2 | 8/2016 | Hicks et al. |
| 9,464,552 B2 | 10/2016 | Calvo |
| 9,528,415 B2 | 12/2016 | Brandl et al. |
| 9,644,516 B1 | 5/2017 | Chiruta et al. |
| 9,670,811 B2 | 6/2017 | De Rudder et al. |
| 9,714,598 B2 | 7/2017 | Alano et al. |
| 9,765,679 B2 | 9/2017 | Palinkas et al. |
| 9,784,163 B2 | 10/2017 | Noren, IV et al. |
| 9,790,833 B2 | 10/2017 | Kobe et al. |
| 9,810,119 B2 | 11/2017 | Gschwind |
| 9,810,123 B2 | 11/2017 | Kauderer et al. |
| 9,995,193 B2 | 6/2018 | Alano et al. |
| 11,428,139 B2 * | 8/2022 | Lu ................... F01N 13/008 |
| 2013/0167516 A1 | 7/2013 | Loman |
| 2015/0040537 A1 * | 2/2015 | Hicks .................. B01F 25/3131 60/273 |
| 2015/0044103 A1 * | 2/2015 | Sampath ............. B01F 25/4315 422/168 |
| 2015/0110681 A1 | 4/2015 | Ferront et al. |
| 2016/0017785 A1 | 1/2016 | Resch et al. |
| 2016/0138454 A1 | 5/2016 | Alano et al. |
| 2016/0186640 A1 | 6/2016 | Calvo et al. |
| 2016/0361694 A1 | 12/2016 | Brandl et al. |
| 2016/0377033 A1 | 12/2016 | Ferront et al. |
| 2017/0082007 A1 | 3/2017 | Alano et al. |
| 2017/0114693 A1 * | 4/2017 | Stelzer ............... B01D 53/9418 |
| 2017/0260888 A1 | 9/2017 | Solipuram et al. |
| 2017/0282135 A1 * | 10/2017 | Whitten .............. B01F 23/2132 |
| 2017/0321592 A1 | 11/2017 | Owen et al. |
| 2019/0101037 A1 * | 4/2019 | Golin ................. B01D 53/9431 |

FOREIGN PATENT DOCUMENTS

| | | | | |
|---|---|---|---|---|
| DE | 102017101749 A1 * | 4/2017 | ......... | B01F 3/04049 |
| DE | 102017100246 A1 | 5/2018 | | |
| EP | 2128398 A1 | 12/2009 | | |
| EP | 2865861 A1 | 4/2015 | | |
| EP | 3216992 A1 | 9/2017 | | |
| EP | 3392480 A1 | 10/2018 | | |
| GB | 2452249 A | 3/2009 | | |
| WO | 2012/013562 A1 | 2/2012 | | |
| WO | 2018/156146 A1 | 8/2018 | | |

OTHER PUBLICATIONS

S. Jensen, "Technologies Come Together for Emissions Reduction", OEM Off-Highway (May 2, 2017).
"Proventia SuperTornado urea mixing technology", The Wayback Machine (Mar. 19, 2019).
International Search Report and Written Opinion for PCT/US2020/040264, dated Aug. 21, 2020.

* cited by examiner

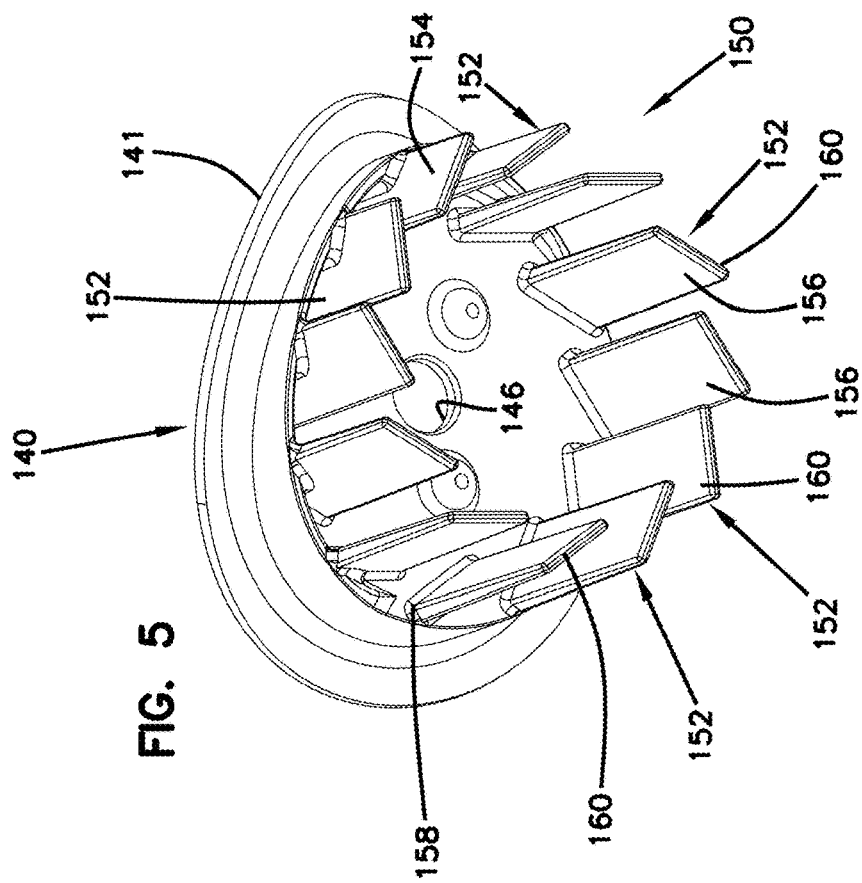
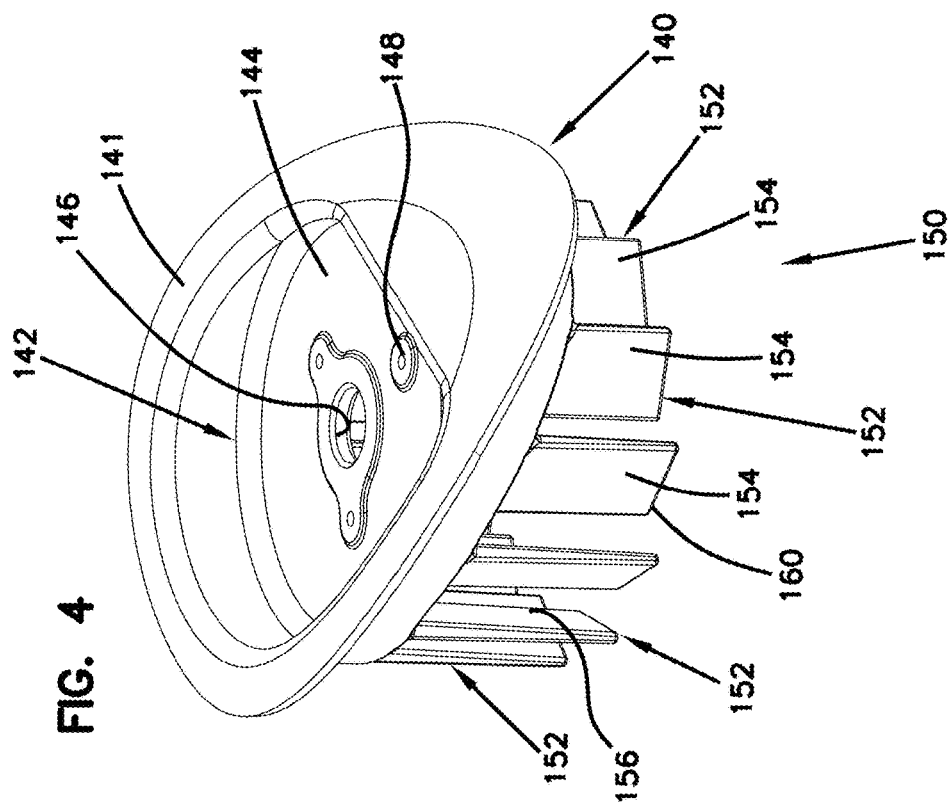

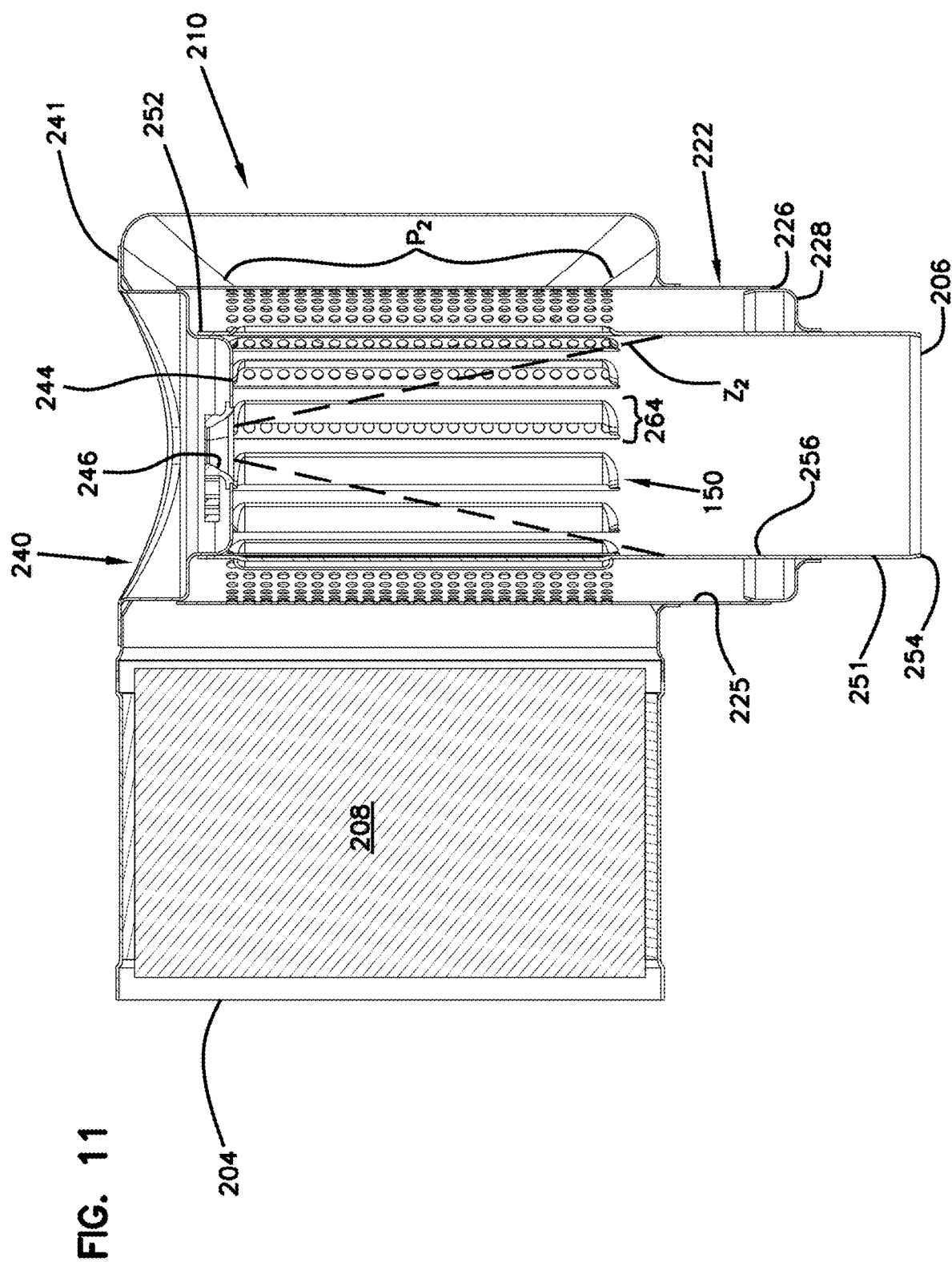

DOSING CONDUIT ARRANGEMENTS FOR EXHAUST AFTERTREATMENT SYSTEM

This application is a US National Stage application of PCT International Patent application No. PCT/US2020/040264, filed Jun. 30, 2020, which claims the benefit of priority to U.S. Provisional patent application Ser. No. 62/872,780, filed Jul. 11, 2019, which applications are incorporated herein by reference. To the extent appropriate, a claim of priority is made to each of the above disclosed applications.

BACKGROUND

Vehicles equipped with diesel engines typically include exhaust systems that have aftertreatment systems such as selective catalytic reduction catalyst devices, lean NOx catalyst devices, or lean NOx trap devices to reduce the amount of undesirable gases, such as nitrogen oxides (NOx) from the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. The efficiency of the aftertreatment system depends at least partially upon how evenly the reactants are mixed with the exhaust gases.

A problem with such catalyst device based systems is that reactant (e.g., urea) and reactant-by-product (e.g., cyanuric acid, biuret, melamine, ammelide, and ammeline) deposits can be formed within the exhaust system when decomposition of the injected reactant is incomplete. First, the deposited reactant does not mix with the exhaust, thereby lowering the efficiency of the system. Second, the deposit buildup may eventually clog the system, inhibiting or preventing exhaust flow from reaching the catalyst device. For example, FIG. 9 shows an example of deposit buildup disposed around the nozzle of the reactant injector (i.e., the doser).

Improvements are desired.

SUMMARY

Certain aspects of the disclosure are directed to a system and method for treating exhaust gas using an aftertreatment device including flow guides disposed within a dosing conduit. Exhaust entering the aftertreatment device flows towards the dosing conduit and enters the dosing conduit through a perforated region. An interior passage of the dosing conduit aligns with a doser mounting unit of the aftertreatment device. Reactant injected from a doser mounted at the doser mounting unit travels through an interior passage of the dosing conduit along a spray zone. The flow guides surround at least a portion of the spray zone and induce swirling to mix the reactant with the exhaust.

In some implementations, the flow guides include a ring of slanted vanes disposed within the dosing conduit. In other implementations, the flow guides include louvered openings defined by a second conduit disposed within the dosing conduit. In still other implementations, the flow guides include guide passages arranged in a ring within the dosing conduit.

In accordance with some aspects of the disclosure, the flow guides are substantially shorter than the perforated region of the dosing conduit. Accordingly, the flow guides induce localized swirling at a swirl region surrounding a nozzle of the doser. In examples, the flow guides are less than half a length of the dosing conduit, less than a third the length of the dosing conduit, less than a quarter of the length of the dosing conduit, or less than a tenth the length of the dosing conduit.

In accordance with other aspects of the disclosure, the flow guides extend substantially along the length of the perforated region of the dosing conduit. Accordingly, the flow guides induce swirling of the exhaust and reactant along at least the perforated region. In certain examples, the flow guides induce swirling of the exhaust and reactant downstream of the dosing conduit.

In accordance with certain aspects of the disclosure, the flow guides are coupled to the doser mounting unit. In some examples, the flow guides have base ends at the doser mounting unit and opposite free ends. In other examples, the flow guides are disposed on a second conduit that is mounted to the doser mounting unit.

Other aspects of the disclosure include a doser mounting unit and a method for reducing the amount of reactant deposit at least at the doser nozzle and/or surrounding area of an exhaust aftertreatment system that includes a reactant doser. Aspects of the disclosure also are directed to a doser mounting unit for an exhaust aftertreatment system that includes a reactant doser. The doser mounting unit is configured to reduce the amount of reactant deposit at the doser nozzle and in an area surrounding the doser nozzle.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 4 is a top perspective view of an example doser mounting unit and flow guide arrangement suitable for use with the aftertreatment device of FIG. 1;

FIG. 5 is a bottom perspective view of the doser mounting unit and flow guide arrangement of FIG. 4;

FIG. 11 is a cross-sectional view of the aftertreatment device of FIG. 10 where a mixer is visible, the mixer including a louvered conduit disposed within a dosing conduit;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an exhaust aftertreatment device with enhanced mixing of reactant injected from a doser. The aftertreatment device includes a conduit having a doser mounting unit at which the doser can be mounted to the conduit. A perforated dosing conduit is disposed within the conduit in alignment with the doser mounting unit so that the reactant injected from the doser travels along a spray zone within the dosing conduit. Flow guides are disposed inside of the perforated dosing conduit to create a mixing (e.g., swirling) flow of the exhaust within the dosing conduit. In certain implementations, the flow guides are offset radially inwardly relative to the dosing conduit.

In some implementations, the flow guides include vanes. In other implementations, the flow guides include guide passages. In still other implementations, the flow guides include louvers disposed on a second conduit.

In some implementations, the flow guides induce localized mixing of the exhaust and reactant at an injecting region (e.g., a region surrounding the doser nozzle). For example, the flow guides may be substantially shorter than the dosing conduit. In other implementations, the flow guides induce mixing of the exhaust and reactant throughout the dosing conduit. In other implementations, the flow guides induce mixing of the exhaust and reactant downstream of the dosing conduit.

Figure 10:
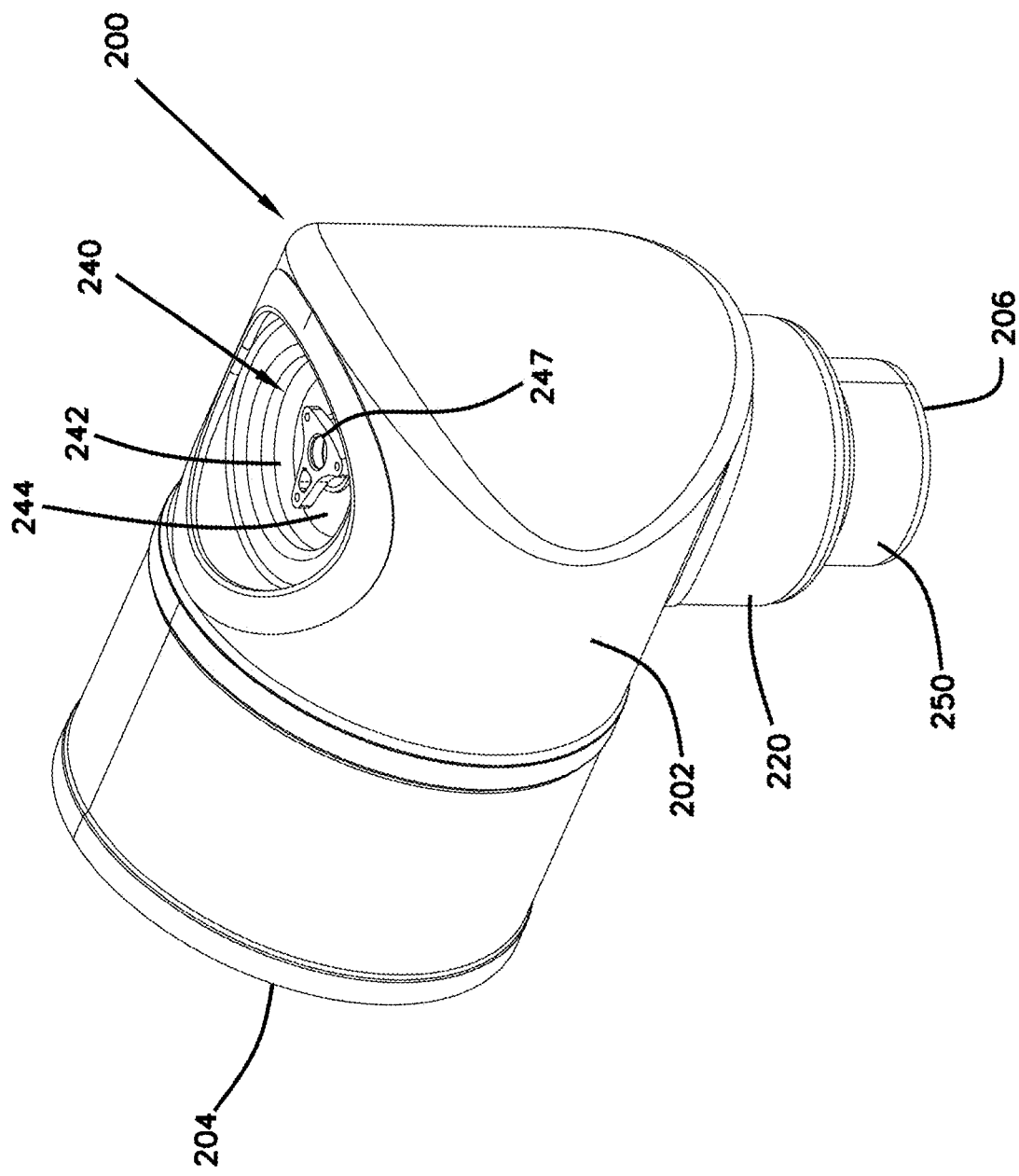
FIG. 10 is a perspective view of another example aftertreatment device including a doser mounting unit, dosing conduit, and flow structure in accordance with aspects of the principles of the present disclosure.

An example exhaust aftertreatment system 100, 200 includes an exhaust flow conduit (e.g., a housing) 102, 202 extending along a longitudinal axis L1, L2. Exhaust enters the conduit 102, 202 through an inlet 104, 204 and exits the conduit 102, 202 through an outlet 106, 206. In some implementations, the inlet 104, 204 is disposed at a location spaced axially inwardly from a first axial end of the conduit 102, 202 (e.g., through a peripheral wall of the flow conduit 102, 202). In other implementations, the inlet 104, 204 may extend from or be formed by the first axial end of the conduit 102, 202. In some examples, the outlet 106, 206 extends from an opposite second axial end of the conduit 102, 202 (e.g., see FIG. 1). In other examples, however, the outlet 106, 206 may be disposed at a location spaced axially inwardly from the second axial end of the conduit 102, 202 (e.g., see FIG. 10).

A doser can be coupled to the exhaust flow conduit 102, 202 at a doser mounting location. For example, the doser is removably mounted to a doser mounting unit 140, 240, which is installed at the doser mounting location of the exhaust flow conduit 102, 202. The doser mounting unit 140, 240 is configured to position and orient a nozzle of the doser to spray reactant (e.g., aqueous urea) within the exhaust flow conduit 102, 202.

The doser mounting unit 140, 240 includes a base 144, 244 coupled to a rim 141, 241 that extends over an exterior of the exhaust flow conduit 102, 202. In other examples, the rim 141, 241 may extend over an interior of the conduit 102, 202. In certain examples, the base 144, 244 is recessed or partially recessed relative to the rim 141, 241 to define a pocket 142, 242 in which a doser or portion thereof may be disposed. The base 144, 244 of the doser mounting unit 140, 240 defines an aperture 146, 246 through which a nozzle of the doser extends into the conduit 102, 202. A mounting adapter 147, 247 may be disposed at the base 144, 244 around the aperture 146, 246. The mounting adapter 147, 247 can be secured to the base 144, 244 using bolts or other fasteners.

A dosing conduit 122, 222 is disposed within the conduit 102, 202 at the doser mounting unit 140, 240. The dosing conduit 122, 222 defines an interior passage 125, 225 extending along a conduit axis C1, C2. In certain examples, the interior passage 125, 225 aligns with the doser mounting unit 140, 240 so that reactant injected by the doser travels along the interior passage 125, 225 or a portion thereof. In some examples, the dosing conduit 122, 222 has a tubular (e.g., cylindrical) shape. In other examples, the dosing conduit 122, 222 has a frustro-conical shape. In still other examples, the dosing conduit 122, 222 has a tubular shape for a portion of its length and a frustro-conical shape for another portion of its length. In other implementations, the dosing conduit 122, 222 is formed from a contoured plate. In still yet other examples, the dosing conduit 122, 222 has any other desired shape.

The dosing conduit 122, 222 defines a plurality of apertures 123, 223 at a perforated region P1, P2 allowing exhaust to flow into an interior of the dosing conduit 122, 222. The apertures 123, 223 can be circular, oblong, rectangular, or any desired shape. In some implementations, the apertures 123, 223 provide an even distribution of exhaust within the interior passage 125, 225 of the dosing conduit. In some examples, the dosing conduit 122, 222 can be uniformly perforated. In other examples, the dosing conduit 122, 222 can have a variable perforation pattern. In an example, the dosing conduit 122, 222 has a first perforation density at a first circumferential side and a second perforation density at a second circumferential side.

Figure 14:
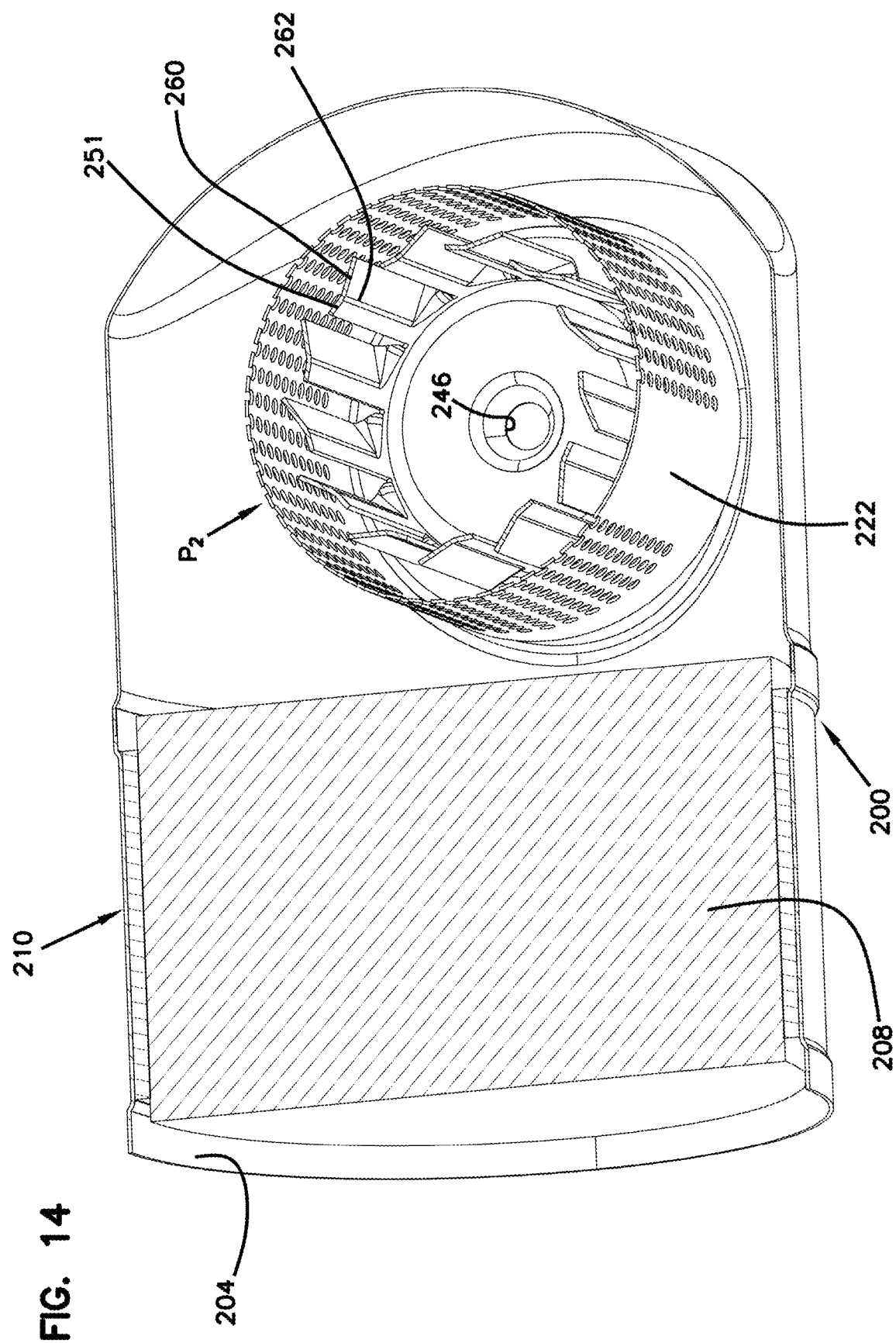
FIG. 14 is another cross-sectional view of the aftertreatment device of FIG. 10.

In some examples, the perforated region P1, P2 extends along less than a full circumference of the dosing conduit 122, 222 (e.g., see FIG. 14). In an example, the perforated region P1, P2 is disposed at an upstream-facing side of the dosing conduit 122, 222. In other examples, the perforated region extends fully around the circumference of the dosing conduit 122, 222. In some examples, the perforated region P1, P2 extends over a majority of a length H2 of the dosing conduit 122, 222. In certain examples, the length of the perforated region P1, P2 differs along the circumference of the dosing conduit 122, 222 (e.g., see FIG. 7). In certain examples, the density of the apertures 123, 223 within the perforated region P1, P2 differs along the circumference of the dosing conduit 122, 222 (e.g., see FIGS. 3 and 17).

A treatment substrate arrangement is disposed in communication with the conduit 102, 202 downstream of the doser mounting unit 140, 240. The treatment substrate arrangement includes one or more treatment substrates. For example, the treatment substrates may include one or more of a selective catalytic reduction (SCR) substrate, or a filter (e.g., an SCR on filter (SCRoF), a diesel particulate filter, etc.).

In certain implementations, a treatment substrate 208 is disposed upstream of the dosing conduit 122, 222. In various implementations, the upstream treatment substrate 208 can be a diesel particulate filter (DPF) or a diesel oxidation catalyst (DOC). In certain implementations, both a DPF and a DOC are disposed upstream of the dosing conduit 122, 222. In certain implementations, the upstream treatment substrate 208 has substantially the same cross-dimension as the downstream treatment substrate arrangement.

In certain implementations, a mixing assembly 110, 210 is disposed within the conduit 102, 202 between the inlet 104, 204 and the outlet 106, 206. The mixing assembly 110, 210 is configured to mix (e.g., swirl or otherwise induce turbulence in) exhaust carrying reactant dispensed from the doser. In certain implementations, the dosing conduit 122, 222 forms part of the mixing assembly 110, 210.

In accordance with certain aspects of the disclosure, one or more flow guides 150 are disposed within the dosing conduit 122, 222. In certain implementations, the flow guides 150 are separate from the dosing conduit 122, 222. In certain implementations, the flow guides 150 are radially offset inwardly from the dosing conduit 122, 222. In some implementations, the flow guides 150 are carried by the doser mounting unit 140. In other implementations, the flow guides 150 are carried by a separate conduit disposed within the dosing conduit 122, 222.

Exhaust entering the mixing assembly 110, 210 flows towards the dosing conduit 122, 222 and enters the dosing conduit 122, 222 through the perforated region P1, P2. The apertures 123, 223 are spaced to balance the flow reaching the flow guides 150 so that the flow is generally evenly distributed around the flow guides 150. For example, the apertures 123, 223 may provide an even distribution of exhaust around the flow guides 150, thereby creating a generally equal distribution of turbulence within the dosing conduit 122, 222. For example, the apertures 123, 223 may provide a sufficiently even distribution of exhaust around the flow guides 150 to induce concentric swirling or other turbulence around a central axis of the dosing conduit 122, 222. Balancing the turbulence results in reactant impacting more evenly over the interior surfaces of the mixing assembly 110, 210, which mitigates liquid pooling on the interior surfaces.

The interior passage 125, 225 of the dosing conduit 122, 222 aligns with a doser mounting unit 140, 240 of the aftertreatment device 100, 200. Reactant injected from a doser mounted at the doser mounting unit 140, 240 travels through the interior passage 125, 225 of the dosing conduit 122, 222 along a spray zone Z1, Z2 (see FIGS. 7 and 11). In certain implementations, the spray zones Z1, Z2 are shaped to impact on a non-perforated surface. (e.g., on non-perforated sections of the dosing conduit 122, 222).

The flow guides 150 induce turbulence (e.g., swirling) within the exhaust carrying the reactant as the exhaust and reactant travel along the passage 125, 225 or a portion thereof. The flow guides 150 surround at least a portion of the spray zone Z1, Z2 and induce swirling or other turbulence to mix the reactant with the exhaust within the conduit 122, 222. In certain implementations, the flow guides 150 are sized and positioned outside of the spray zone Z1, Z2 so that reactant injected from the doser does not contact the flow guides 150. For example, the flow guides 150 may be sufficiently radially offset from the nozzle and sufficiently short to terminate before (i.e., not extend into) the spray zone Z1, Z2.

In some implementations, the flow guides 150 include a ring of slanted vanes 152 disposed within the dosing conduit 122 (e.g., see FIG. 5). In other implementations, the flow guides 150 include guide passages 170 arranged in a ring within the dosing conduit 122 (e.g., see FIG. 8). In still other implementations, the flow guides 150 include louvered openings 262 defined by a second conduit 250 disposed within the dosing conduit 222 (e.g., see FIG. 13). In some implementations, the flow guides 150 are arranged to swirl or otherwise mix exhaust at an angular velocity of at least 5 meters per second. In certain implementations, the flow guides 150 are arranged to swirl or otherwise mix exhaust passing through the flow guides 150 at an angular velocity of at least 10 meters per second. In certain implementations, the flow guides 150 are arranged to swirl or otherwise mix exhaust passing through the flow guides 150 at an angular velocity of between 10-20 meters per second.

The perforated region P1, P2 of the dosing conduit 122, 222 at least partially overlaps with the flow guides 150. The perforated region P1, P2 provides an open area (i.e., the total open area defined by the apertures 123, 223) through which the flow enters the dosing conduit 122, 222. The greater the open area, the more exhaust that can flow through the open area into the dosing conduit 122, 222. The more flow entering the exhaust conduit 122, 222 at a particular region, the greater the turbulence (e.g., swirl) at that region. Increasing the turbulence within a region may increase the heat transfer to surfaces within the region, thereby inhibiting the formation of reactant deposits on those surfaces. Increasing the turbulence within a region may sweep reactant droplets away from surfaces within the region, thereby inhibiting the formation of reactant deposits on those surfaces. Increasing the turbulence within a region may increase swirl velocity within the region, which may radially propel reactant droplets out of the spray zone Z1, Z2 and into the flow guides 150 within that region.

In certain implementations, the open area defined by the perforated region P1, P2 of the dosing conduit 122, 22 is selected to balance the benefits of heat transfer and/or sweeping with the detriment of propelling reactant droplets beyond the spray zone Z1, Z2. The open area defined by the perforated region is controlled by the size, density, and axial position of the apertures 123, 223 of the perforated region P1, P2. Accordingly, to vary the open area between implementations, the size, density, and/or axial position of the apertures 123, 223 may be varied.

In some implementations, the axial position of the perforated region P1, P2 begins at the inner surface of the doser mounting unit 140 so that the perforated region P1, P2 extends fully along a height H1 of the flow guides 150. Starting the perforated region P1, P2 at the inner surface of the doser mounting unit 140 may allow the exhaust to flow (e.g., swirl) at the inner surface, thereby transferring heat to the inner surface of the doser mounting unit 140 and/or to the nozzle of the doser. In other implementations, the axial position of the perforated region P1, P2 is axially offset from the inner surface of the doser mounting unit 140 to overlap the flow guides 150 along only a portion of the height H1 of the flow guides 150. Starting the perforated region P1, P2 offset from the doser mounting unit 140 may axially offset swirling of the exhaust sufficiently far from the doser mounting unit to inhibit radially propelling reactant droplets injected by the doser against the flow guides 150.

In various examples, the perforated region P1, P2 is offset from the inner surface of the doser mounting unit 140 by $1/24^{th}$ of an inch, $1/20^{th}$ of an inch, $1/16^{th}$ of an inch, $1/12^{th}$ of an inch, $1/8^{th}$ of an inch, $1/4^{th}$ of an inch, $1/3^{rd}$ of an inch, $1/2$ inch, $3/4^{th}$ of an inch, $2/3^{rd}$ of an inch, or an inch. In various examples, the perforated region P1, P2 is offset from the inner surface of the doser mounting unit 140 by less than half the height H1 of the flow guides 150, by less than a third the height H1 of the flow guides 150, by less than a quarter the height H1 of the flow guides 150, by less than an tenth the height H1 of the flow guides 150, or by less than a twentieth the height H1 of the flow guides 150.

In certain implementations, the size and/or density of the apertures 123, 223 of the perforated region P1, P2 changes along the circumference of the dosing conduit 122, 222 to vary the open area along the circumference. In certain examples, the dosing conduit 122, 222 is less than 50% open at a side facing the inlet 104, 204 and is greater than 50% open at an opposite side. In certain examples, the dosing conduit 122, 222 is less than 40% open at a side facing the inlet 104, 204 and is greater than 40% open at an opposite side. In certain examples, the dosing conduit 122, 222 is between 20% and 50% open at a side facing the inlet 104, 204 and is between 40% and 70% open at an opposite side. In certain examples, the dosing conduit 122, 222 is between 25% and 45% open at a side facing the inlet 104, 204 and is between 45% and 65% open at an opposite side. In certain examples, the dosing conduit 122, 222 is between 30% and 40% open at a side facing the inlet 104, 204 and is between 50% and 60% open at an opposite side. In an example, the dosing conduit 122, 222 is about 32% open at a side facing the inlet 104, 204. In an example, the dosing conduit 122, 222 is about 34% open at a side facing the inlet 104, 204. In an example, the dosing conduit 122, 222 is about 36% open at a side facing the inlet 104, 204. In an example, the dosing conduit 122, 222 is about 38% open at a side facing the inlet 104, 204. In an example, the dosing conduit 122, 222 is about 52% open at the opposite side. In an example, the dosing conduit 122, 222 is about 54% open at the opposite side. In an example, the dosing conduit 122, 222 is about 56% open at the opposite side. In an example, the dosing conduit 122, 222 is about 58% open at the opposite side.

Figure 1:
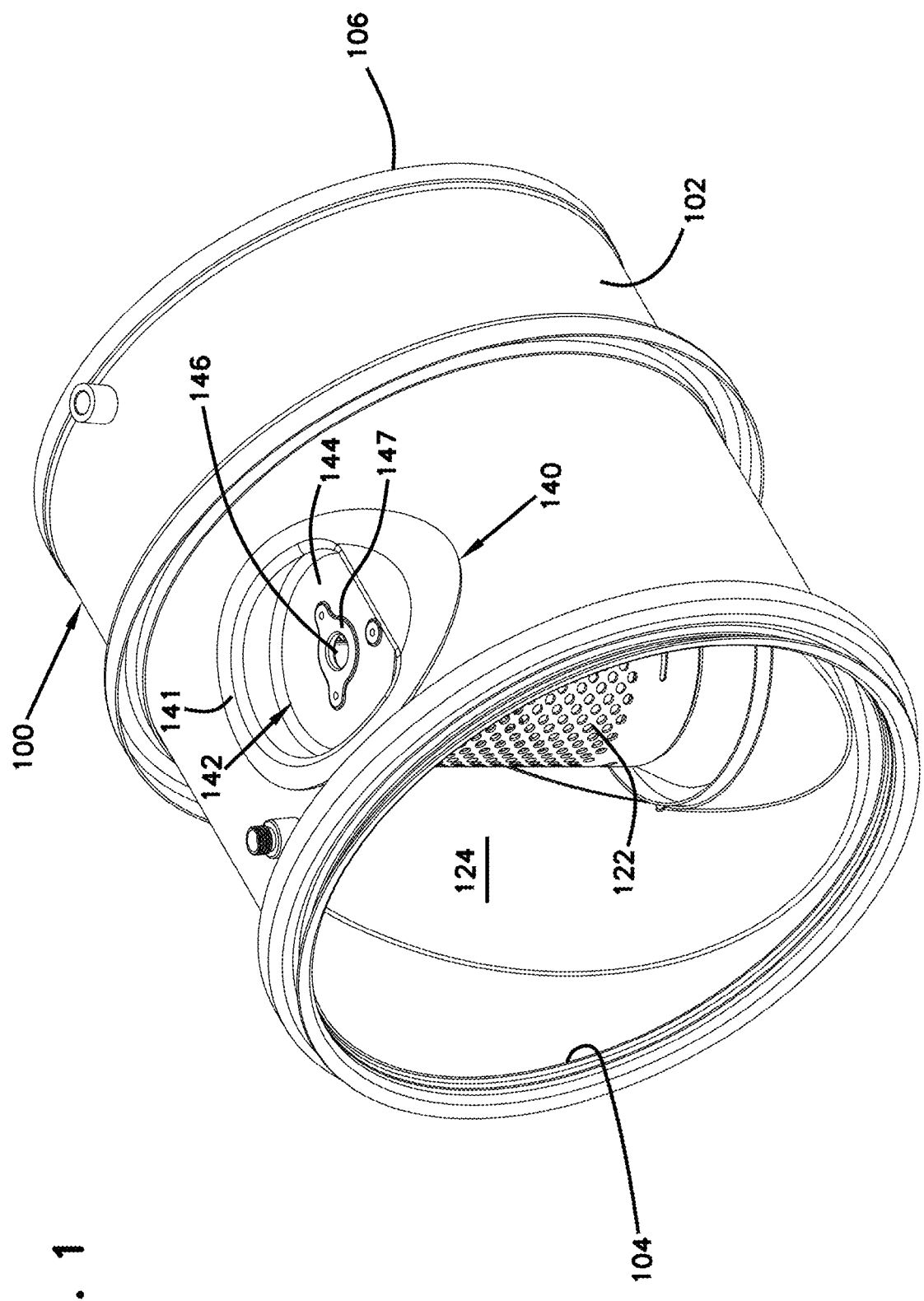
FIG. 1 is a perspective view of an example aftertreatment device including a doser mounting unit, dosing conduit, and flow structure in accordance with aspects of the principles of the present disclosure.
Figure 2:
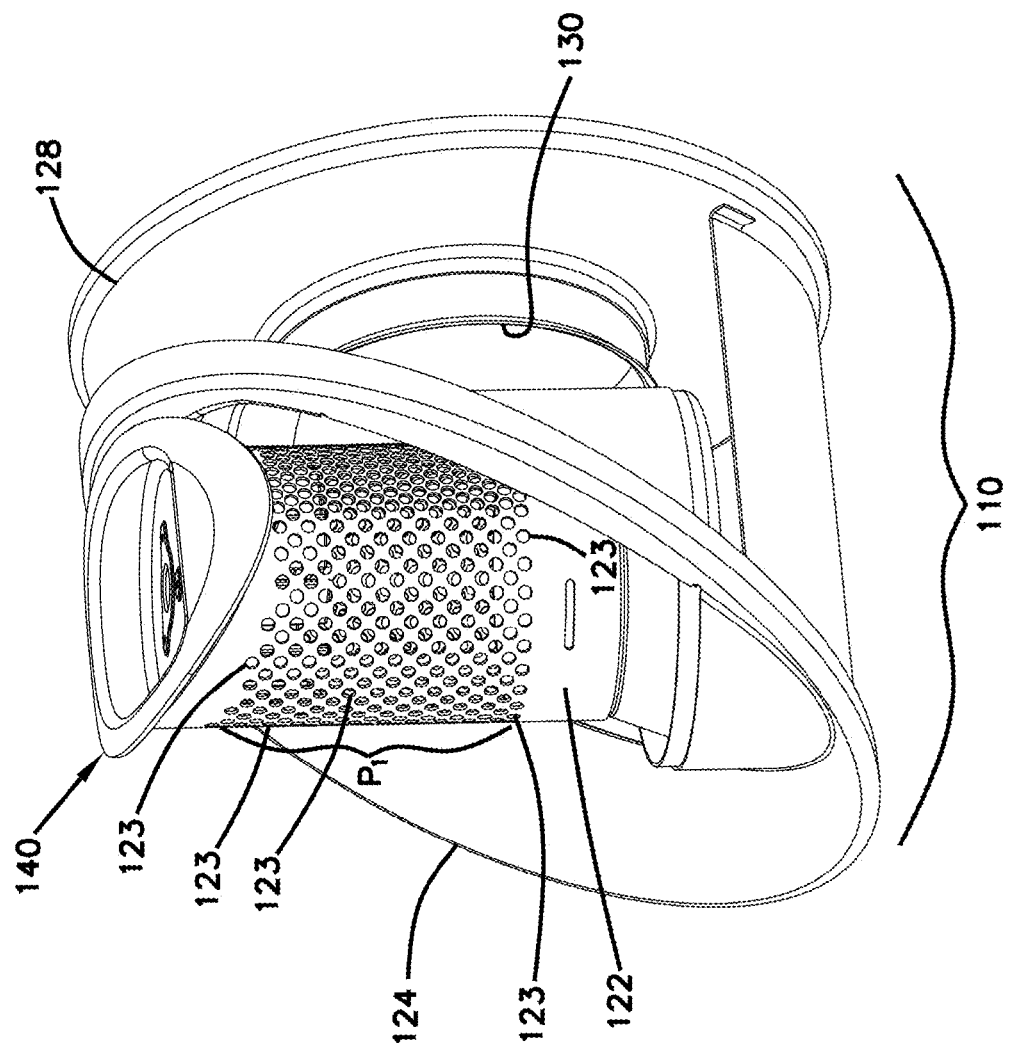
FIG. 2 is a perspective view of a mixing arrangement of the aftertreatment device of FIG. 1 with a deflection baffle, dosing conduit, doser mounting unit, and restricting member visible.
Figure 3:
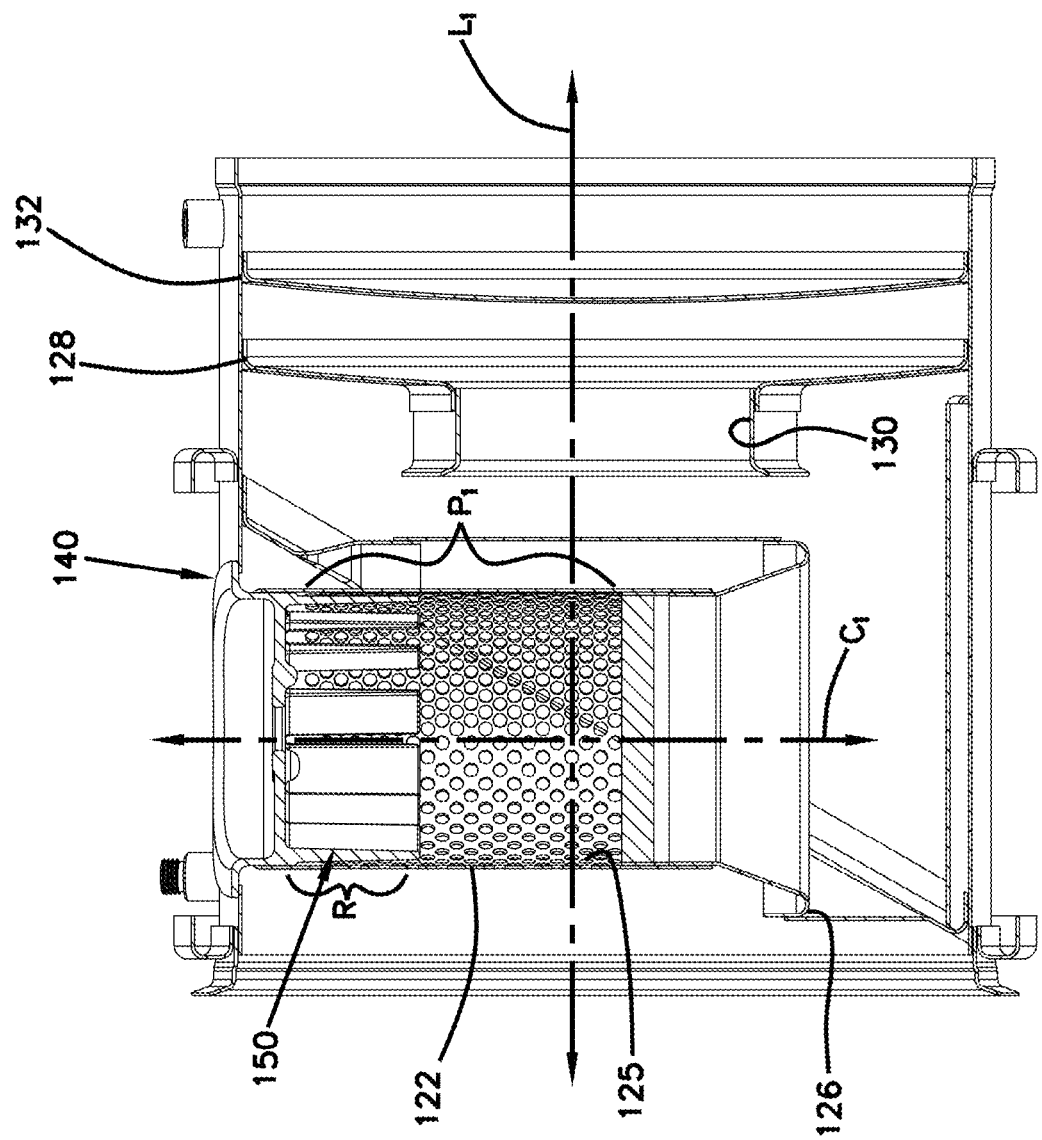
FIG. 3 is a cross-sectional view of the aftertreatment device of FIG. 1 wherein an example flow guide arrangement is visible.
Figure 6:
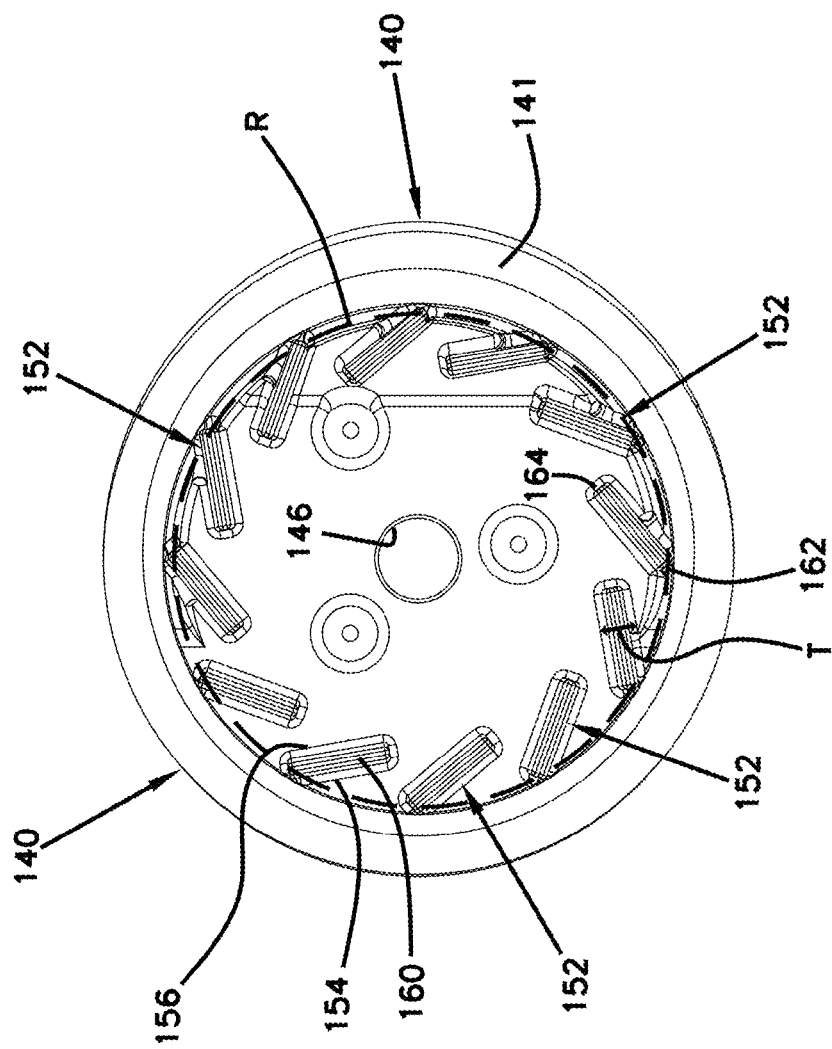
FIG. 6 is a bottom plan view of the doser mounting unit and flow guide arrangement of FIG. 4.

FIGS. 1-9 illustrate example flow guides 150 configured to induce localized mixing (e.g., swirling or other turbulence) to inhibit buildup of reactant deposit within an injecting region R within the dosing conduit 122 as will be discussed in more detail herein. Referring now to FIGS. 1-3, in some implementations, the mixing assembly 110 includes a mixing arrangement and a restricting member 128 downstream of the mixing arrangement. In certain examples, the mixing assembly 110 includes a dispersing member 132 downstream of the restricting member 128. In certain implementations, the downstream treatment substrate arrangement is aligned with the mixing assembly 110 along the longitudinal axis L of the conduit 102.

The mixing arrangement includes a deflection baffle 124 that divides the mixing assembly 110 into an upstream region and a downstream region. The deflection baffle 124 defines an aperture 126 through which exhaust flows between the upstream and downstream regions (see FIG. 3).

The dosing conduit 122, 222 is disposed in the upstream region between the aperture 126 and the doser mounting unit 140, 240. In certain examples, the doser mounting unit 140, 240 aligns the nozzle to spray reactant towards the aperture 126 in the deflection baffle 124. In certain examples, the aperture 126 has a cross-dimension that extends along the longitudinal axis L of the conduit 102. In certain examples, the aperture 126 is offset from a central longitudinal axis sufficient to induce swirling or other turbulence of exhaust passing through the aperture 126. In certain examples, the mixing arrangement includes further mixing baffles (e.g., a swirl baffle defining a ring of louvered openings).

The restricting member 128 is configured to reduce an amount of unvaporized/unhydrolized reactant reaching a treatment substrate. The restricting member 128 defines a restricted passage 130 through which the exhaust passes from an upstream side of the restricting member 128 to a downstream side of the restricting member 128. The dispersing member 132 is configured to even out the exhaust flow across the transverse cross-section of the conduit 102 after the exhaust passes through the mixing arrangement and restricting member 128.

Additional information about various mixing assemblies suitable for use in the aftertreatment system 100 are disclosed in U.S. Pat. No. 10,179,315, the disclosure of which is hereby incorporated herein by reference in its entirety.

In accordance with certain aspects of the disclosure, the doser mounting unit 140 includes one or more flow structures 150 to induce localized swirling or other turbulence of the exhaust within an injecting region R surrounding the doser nozzle. In certain examples, the localized swirling or other turbulence inhibits reactant buildup at on the doser mounting unit 140 and/or on the doser nozzle. For example, the localized swirling or other turbulence may have sufficient angular velocity to sweep the reactant spray away from the nozzle as the doser injects the reactant into the dosing conduit 122. The turbulent flow also inhibits the reactant from landing on the doser mounting unit 140 and/or the flow structures 150. In certain implementations, the localized turbulence increases heat transfer from the exhaust to the nozzle, the flow structures 150, and/or the doser mounting unit 140. Heating the nozzle, flow structures 150, the doser mounting unit 140, or some combination thereof inhibits deposit formation thereon by promoting evaporation of the reactant.

The region R is sized and shaped to fit within the interior passage 125 of the dosing conduit 122. In certain examples, the region R forms a ring around the doser aperture 146. In some examples, an outer boundary of the region R is defined by an outer circumference of the base 144. In other examples, the outer boundary of the region R is defined by the flow structures 150. In other examples, the outer boundary of the region R is defined by an interior surface of the dosing conduit 122. To form the region R, the flow structures 150 at least partially circle the doser aperture 146. In some implementations, the flow structures 150 form a full circle around the doser aperture 146 (e.g., see FIG. 6). In other examples, the flow structures 150 form a half circle around the doser aperture 146 (e.g., see FIG. 8).

In certain examples, the flow structures 150 induce swirling or other turbulence in less than all of the exhaust flowing through the apertures 123 of the dosing conduit 122. In certain examples, the flow structures 150 induce swirling or other turbulence is less than three-quarters of the exhaust flowing through the apertures 123 of the dosing conduit 122. In certain examples, the flow structures 150 induce swirling or other turbulence is less than half of the exhaust flowing through the apertures 123 of the dosing conduit 122. In certain examples, the flow structures 150 induce swirling or other turbulence is less than a third of the exhaust flowing through the apertures 123 of the dosing conduit 122. In certain examples, the flow structures 150 induce swirling or other turbulence is less than a quarter of the exhaust flowing through the apertures 123 of the dosing conduit 122.

Figure 7:
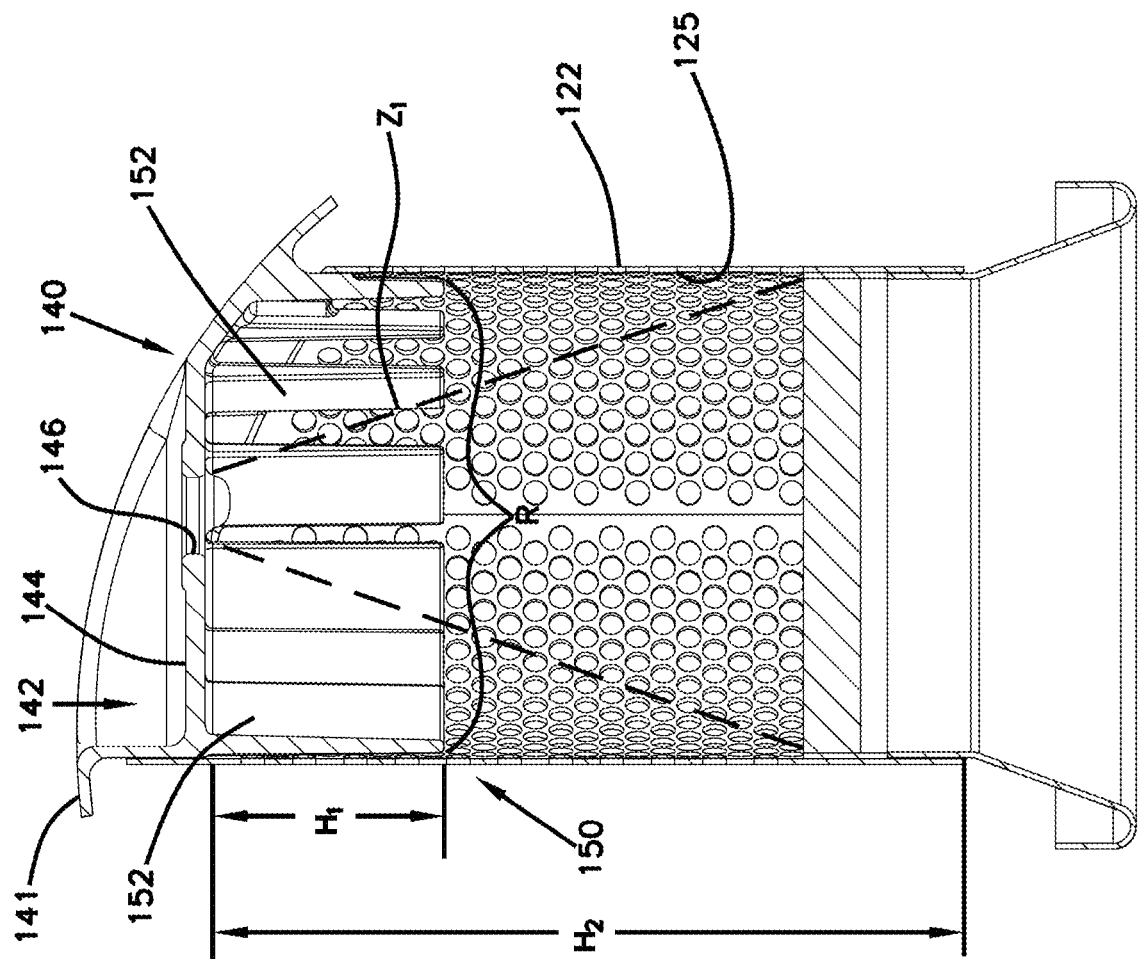
FIG. 7 is an enlarged cross-sectional view of the dosing conduit, doser mounting unit, and flow guide arrangement of FIG. 3.

In certain examples, the region R has a length H1 extending from the doser mounting unit 140 to a free end of one or more of the flow structures 150 (e.g., see FIG. 7). In some implementations, the region R has a length H1 that is less than a length H2 of the dosing conduit 122. In certain implementations, the length H1 of the region R is less than half of the length H2 of the dosing conduit 122. In certain implementations, the length H1 of the region R is less than a third of the length H2 of the dosing conduit 122. In certain implementations, the length H1 of the region R is less than a quarter of the length H2 of the dosing conduit 122. In certain implementations, the length H1 of the region R is sufficiently small that a majority of the exhaust flowing through the apertures does not pass through the flow structures 150.

In the example shown in FIGS. 4-7, the flow structures 150 include a plurality of vanes 152 extending downwardly from the doser mounting unit 140. Each vane 152 extends along a length between a base end 158 disposed at the doser mounting unit 140 and a free end 160 spaced from the doser mounting unit 140. In some implementations, the vanes 152 each have a common length. In other implementations, however, the vanes 152 can vary in length. In certain implementations, the vanes 152 are sized so that the free ends 160 of the vanes 152 terminate at a common position along the length of the dosing conduit 122 (e.g., see FIG. 7). In certain implementations, the vanes 152 are sized so that the free ends 160 of the vanes 152 terminate before intersecting the spray zone Z1 of the doser nozzle (e.g., see FIG. 7).

Each vane 152 has opposite first and second guide surfaces 154, 156 separated by a thickness T. In certain examples, the first and second guide surfaces 154, 156 of the vanes 152 are flat. In certain implementations, the vanes 152 have opposite first and second edges 162, 164 extending along the thickness T and along the length of the vanes 152. The vanes 152 are oriented so that the first edges 162 face at least partially away from the doser aperture 146 (i.e., toward the doser nozzle) and the second edges 164 face at least partially towards the doser aperture 146. In certain implementations, the vanes 152 are oriented so that the first guide surfaces 154 face away from the doser aperture 146 and the second guide surfaces 156 face towards the doser aperture 146.

The vanes 152 are spaced sufficiently from adjacent vanes to define flow channels 165 therebetween. In certain implementations, the vanes 152 are positioned and oriented so that the second edge 164 of one vane 152 overlaps the first edge 162 of an adjacent vane 152. Accordingly, the channels 165 do not extend radially into the injecting region R. Rather, the channels 165 are angled to direct the exhaust passing through the channels 165 in a swirling motion. In certain examples, the channels 165 are angled so that the exhaust flowing through the channels 165 tangentially enters the injecting region R. In the example shown, each flow channel 165 begins at an outer periphery of the doser mounting unit 140, passes over the first edge 162 of a vane 152, over the first guide surface 154 of the vane 152, between the second edge 164 of the vane 152 and the first edge 162 of an adjacent vane 152, and over the second guide surface 156 of the adjacent vane 152.

Figure 8:
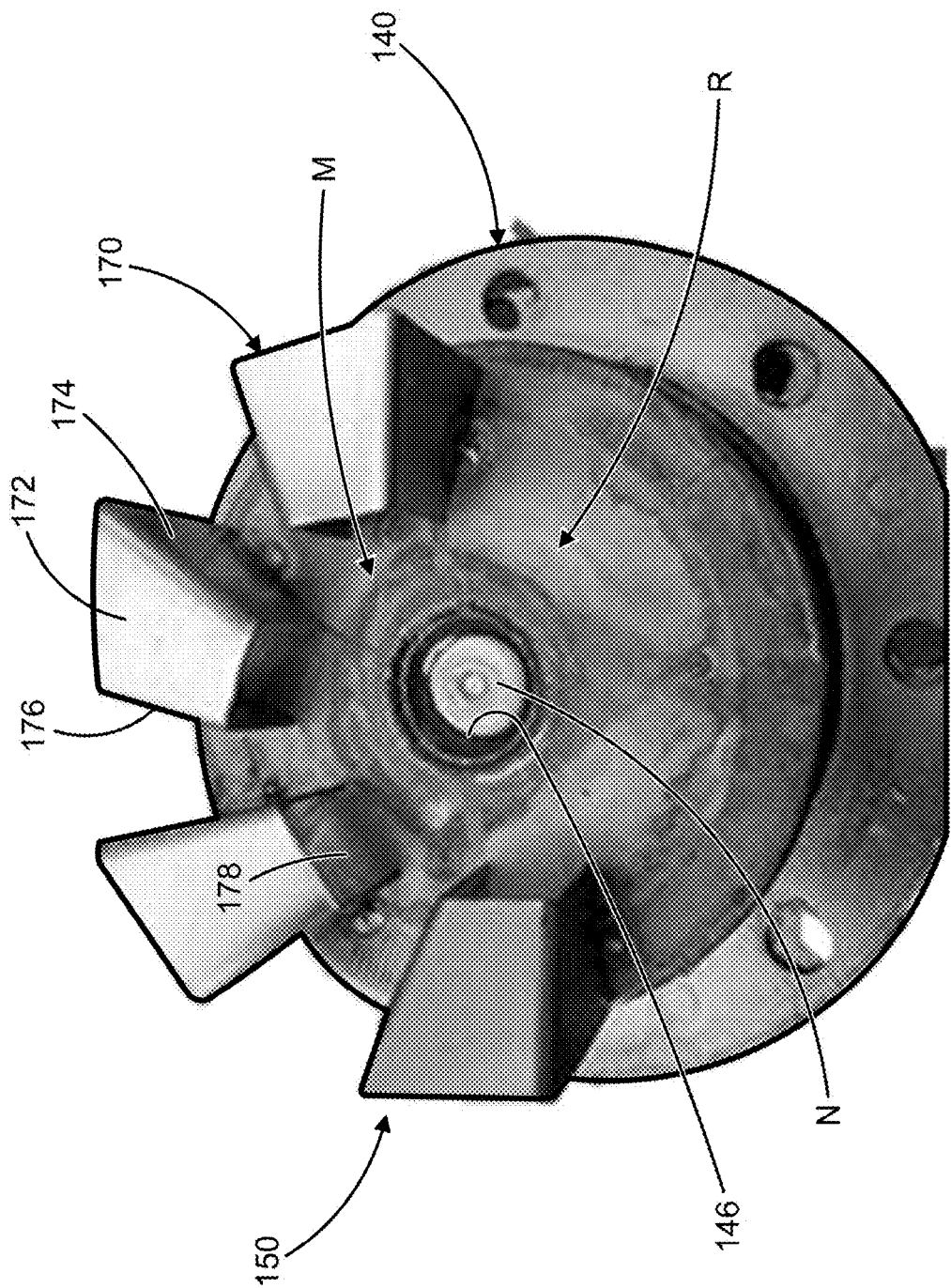
FIG. 8 illustrates another example flow guide arrangement suitable for use with the doser mounting unit of FIG. 4 and/or the aftertreatment device of FIG. 1.
Figure 9:
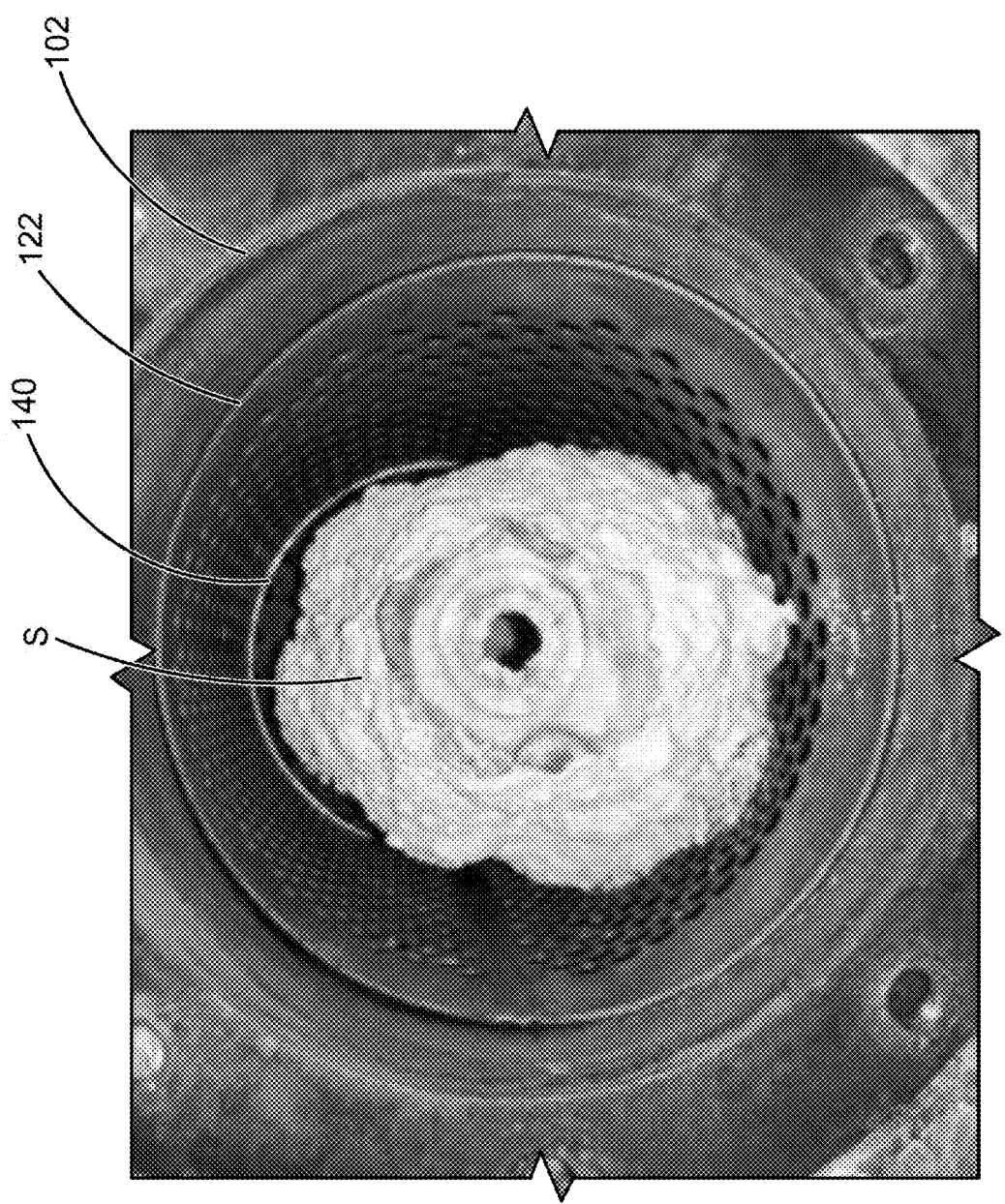
FIG. 9 illustrates reactant deposit buildup within a dosing conduit not including a flow guide arrangement.

In the example shown in FIG. 8, the flow structures 150 include flow passageways 170 extending downwardly from the doser mounting unit 140. The flow passageways 170 define flow channels 178 leading into the injecting region R that surrounds the doser nozzle N. The flow passageways 170 include side members 174, 176 extending downwardly from the doser mounting unit 140. A bottom member 172 extends across the ends of the side members 174, 176 of each passageway 170 opposite the doser mounting unit 140.

The passageways 170 are oriented so that the channels 178 do not face radially towards the doser aperture 146. The passageways 170 are oriented so that the channels 178 are angled to direct exhaust flow around the doser aperture 146. For example, the channel 178 of each passageway 170 defines a flow axis M that does not intersect the doser aperture 146. In certain examples, the flow axis M of each channel 178 extends tangential to the doser aperture 146. In certain examples, the flow axis M of each channel 178 if offset from the doser aperture 146.

In certain implementations, each flow passageways 170 is oriented between about 35 degrees and about 75 degrees from an adjacent flow passageway 170. In certain implementations, each flow passageways 170 is oriented between about 45 degrees and about 70 degrees from an adjacent flow passageway 170. In certain implementations, each flow passageways 170 is oriented between about 55 degrees and about 65 degrees from an adjacent flow passageway 170. In certain examples, each flow passageways 170 is oriented about 60 degrees from an adjacent flow passageway 170.

In some implementations, the channels 178 each have a constant transverse cross-dimension along a length of the channel 178. In other implementations, the channels 178 change in size and/or shape over the length of the channel 178. In the example shown, the channel 178 narrows as the channel 178 extends towards the injection region R. For example, the passageways 170 can be shaped to be wider closer to the doser rim 141 and narrower closer to the doser aperture 146.

In certain implementations, each channel is 178 are between 0.5 inch and 2 inches long. In certain implementations, each channel is 178 are between 0.75 inch and 1.5 inches long. In an example, the channels 178 are each about 1 inch long. In an example, the channels 178 are each about 1.25 inch long. In certain implementations, the outer ends of the channels 178 are dimensioned between 0.75 inches×0.75 inches and 2 inches×2 inches. In certain implementations, the outer ends of the channels 178 are dimensioned between 1 inch×1 inch and 1.5 inches×1.5 inches. In an example, the outer end of each channel 178 is about 1.25 inches×1.25 inches. In certain implementations, the inner ends of the channels 178 are dimensioned between 0.25 inches×0.25 inches and 2 inches×2 inches. In certain implementations, the inner ends of the channels 178 are dimensioned between 0.5 inches×0.5 inches and 1.25 inches×1.25 inches. In an example, the inner end of each channel 178 is about 0.75 inches×0.75 inches. In still other examples, the inner and/or outer ends can be wider than they are tall or taller than they are wide.

FIGS. 10-14 illustrate an example mixing assembly 210 and example flow guide 150 configured to induce mixing (e.g., swirling or other turbulence) of the exhaust and reactant both within and outside the injecting region R. In some implementations, the mixing assembly 210 includes a second conduit 250 disposed within the dosing conduit 222.

The second conduit 250 carries the flow guides 150. In certain implementations, the second conduit 250 defines the flow guides 150.

The second conduit 250 includes a conduit body 251 extending between a first end 252 and a second end 254. In some implementations, the first end 252 is mounted to the doser mounting unit 240 (e.g., see FIG. 11). In other implementations, the first end 252 is aligned with, but spaced from, the doser mounting unit 240. In certain implementations, the second end 254 defines the outlet for the aftertreatment device 200.

The doser is configured to inject reactant within the second conduit 250 so that the reactant travels along a passage 256 defined by the second conduit 250. In some examples, the doser nozzle and the second conduit 250 are configured so that a spray zone Z2 does not intersect flow guides 150 defined by the second conduit 250 (e.g., see FIG. 11). Accordingly, the reactant does not impact on the flow guides 150, which reduces deposit formation on the flow guides 150. In certain implementations, the spray zone Z2 impacts the second conduit 250 below the louvered openings 264. Accordingly, the reactant is maintained within the second conduit 250, which reduces deposit formation between the second conduit 250 and the dosing conduit 222. In other examples, the doser nozzle and the second conduit 250 are configured so that a spray zone Z2 does not intersect the second conduit 250.

Figure 13:
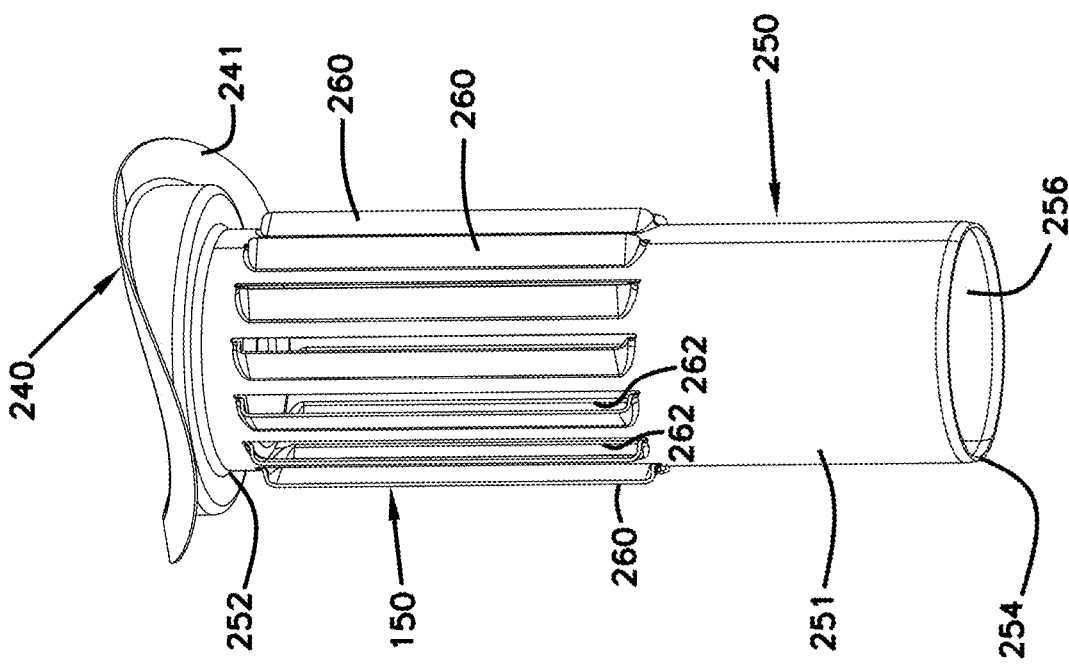
FIG. 13 is a perspective view of the louvered conduit of the mixer of FIG. 11.

As shown in FIGS. 11 and 13, the flow guides 150 include louvers 260 disposed at openings 262 defined in a circumferential surface of the second conduit body 251 to form louvered openings 264. In the example shown, the louvers 260 of the louvered openings 264 extend outwardly from the second conduit body 251. In other examples, the louvers 256 may extend into the second conduit body 251. In some examples, the louvered openings 264 are disposed in a full circle around the circumference of the second conduit 250 (e.g., see FIG. 14). In other examples, the louvered openings 264 may be disposed around less than a full circumference of the second conduit 250. In the example shown, the openings 262 are wider than the sections of the second conduit body 251 disposed between the openings 262 (e.g., see FIG. 14). In other examples, the openings 262 can be circumferentially spaced a greater distance than their width.

Figure 12:
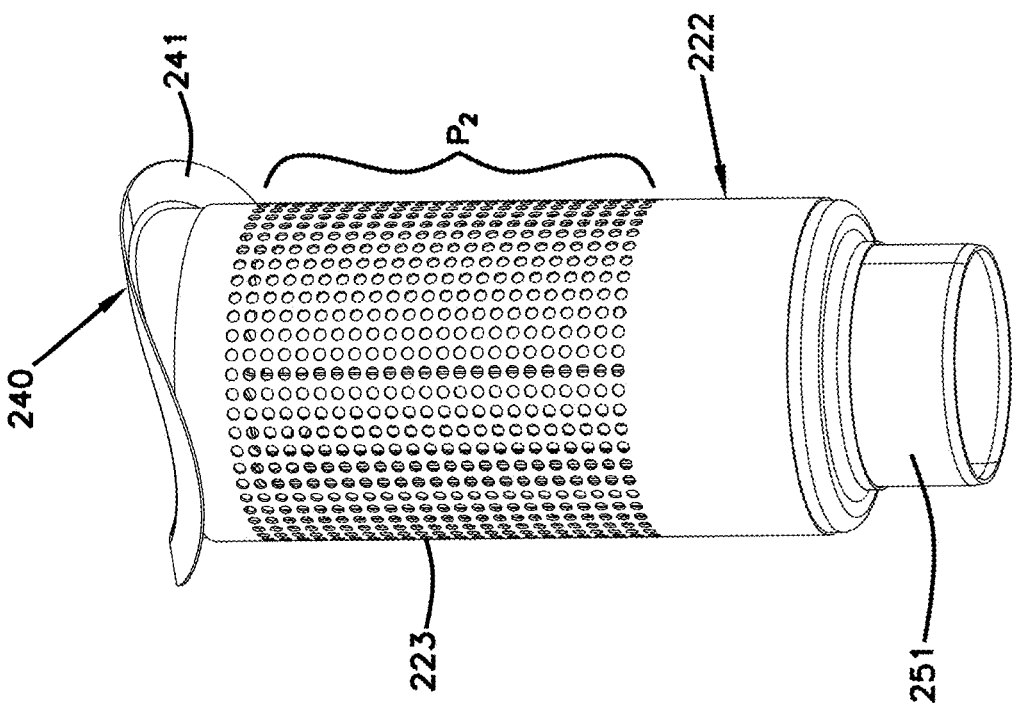
FIG. 12 is a perspective view of the mixer of FIG. 11.

As shown in FIGS. 11 and 12, the dosing conduit 222 extends around the second conduit 250. The dosing conduit 222 has a body extending between a first end 224 and a second end 226. In some implementations, the first end 224 of the dosing conduit 222 mounts to the doser mounting unit 140 (e.g., see FIG. 11). In other implementations, the first end 224 of the dosing conduit 222 may mount to the second conduit 250. The body of the dosing conduit 222 is radially spaced from the second conduit body 251 for at least a majority of a length of the dosing conduit 222.

In some implementations, all of the exhaust flow passing through the dosing conduit 222 also passes through the second conduit 250. For example, the end 226 of the dosing conduit 222 may be coupled to the second conduit 250 so that only the second conduit 250 provides a through-opening for the exhaust. In some examples, the end 226 of the conduit 250 may taper or otherwise contour inwardly to contact the second conduit 250. In other examples, an end cap (e.g., a cup baffle) 228 may extend between the end 226 of the dosing conduit 222 and the body 251 of the second conduit 250 (e.g. see FIG. 11). In other implementations, the dosing conduit 222 may provide an output for the exhaust, thereby allowing the exhaust to bypass the flow louvered openings 264.

In some implementations, the louvered openings 264 extend the length of the second conduit 250. In other implementations, the louvered openings 264 extend along only part of the length of the second conduit 250. In certain implementations, the dosing conduit 222 has sufficient length to extend over a non-louvered section of the second conduit 250. The space between the non-louvered section of the second conduit 250 and the dosing conduit 222 keeps the non-louvered section of the second conduit 250 heated relative to ambient air. In particular, the space provides insulation between the non-louvered section of the second conduit 250 and an exterior surface of the aftertreatment device 200. Further, the non-louvered surface is exposed on both sides to hot exhaust. Accordingly, the surface temperature where the reactant impacts the second conduit passageway 256 is sufficiently high to mitigate deposit formation.

In some examples, the portion of the dosing conduit 222 that extends over the non-louvered section of the second conduit 250 is not perforated. Accordingly, the reactant is maintained within the second conduit 250. In other examples, the dosing conduit 222 may have perforations in the portion extending over the non-louvered section of the second conduit 250.

Figure 15:
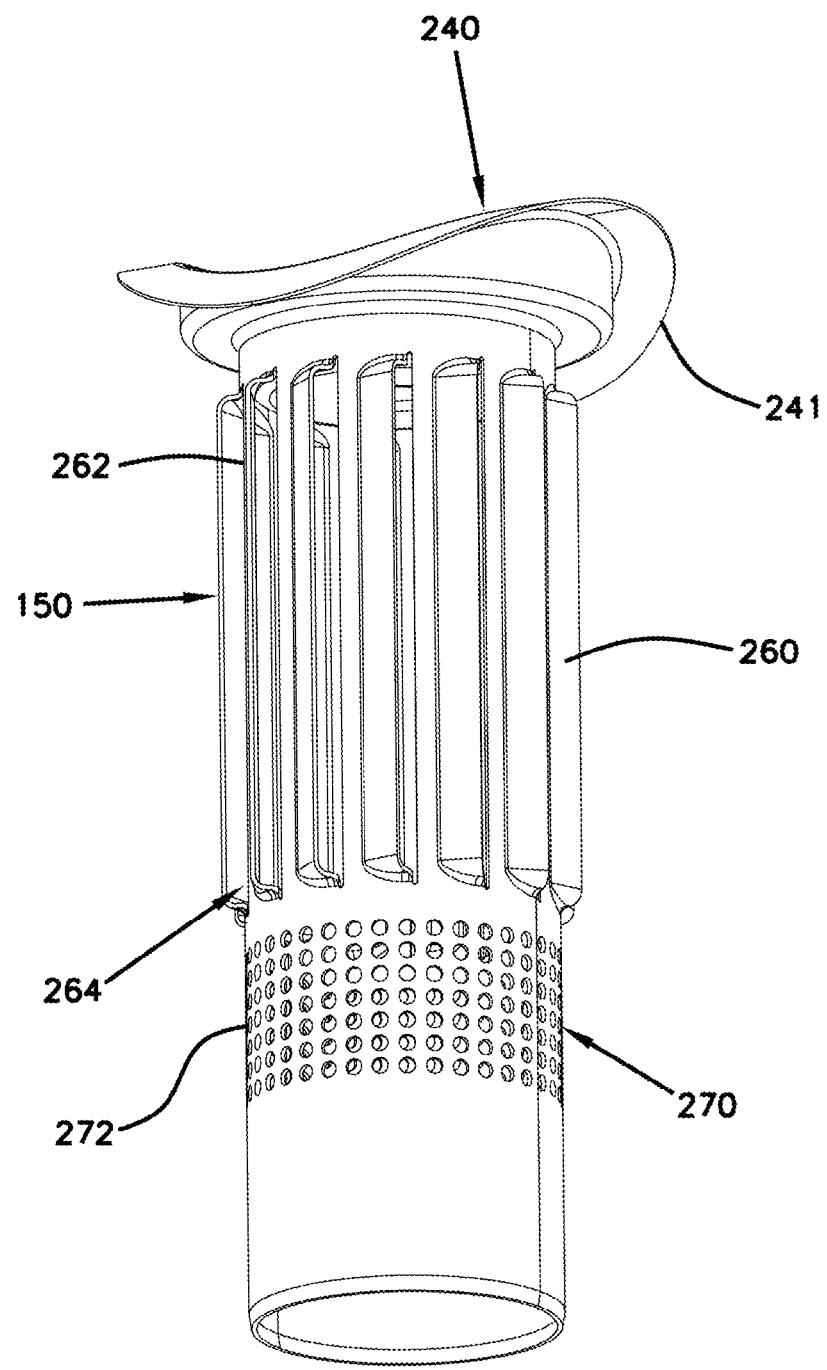
FIG. 15 is a perspective view of another example louvered conduit suitable for use with the mixer of FIG. 11.
Figure 16:
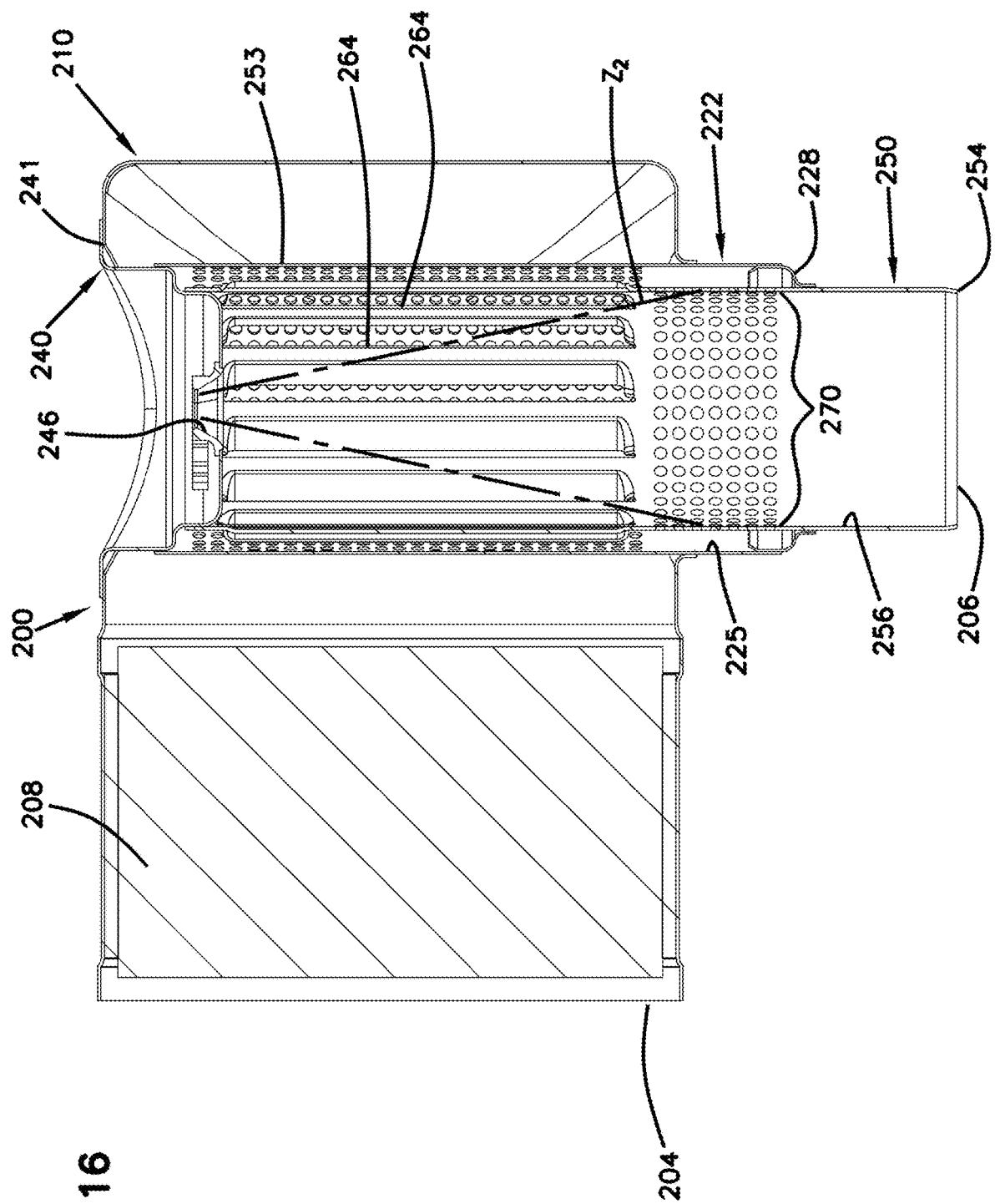
FIG. 16 is a cross-sectional view of the aftertreatment device of FIG. 10 shown with the louvered conduit of FIG. 15.

FIGS. 15 and 16 illustrate a variation on the mixing assembly 210 that utilizes an alternative embodiment, referred to herein using the designation 250', of the second conduit 250. The alternative second conduit 250' is substantially the same as the second conduit 250 except that the second conduit 250' also defines a perforated section 270 below the louvered openings 264. The perforated section 270 may allow some droplets of reactant to pass through the perforations to reduce liquid pooling within the second conduit 250'.

The second conduit 250' defines a plurality of apertures 272 at the perforated section 270. In various examples, the apertures 272 can be circular, elongated, rectangular, or any desired shape. In some examples, the apertures 272 are evenly distributed around a circumference of the second conduit 250' (e.g., have an even density). In other examples, the size, shape, density, and/or layout of the apertures 272 may vary around the circumference and/or along the height of the second conduit 250'.

In certain implementations, the perforated section 270 is positioned along the second conduit 250' to be disposed within the dosing conduit 222. In certain implementations, the perforated section 270 is closed within the dosing conduit 222 by the end cap 228 (see FIG. 16). In certain implementations, the perforated section 270 is positioned along the second conduit 250' to be intersected by the spray zone Z2 of the doser nozzle. Accordingly, the reactant dispensed from the doser impacts the second conduit 250' at the perforated section 270 (e.g., see FIG. 16).

In some implementations, the apertures 272 at the perforated section 270 are sized and positioned so that a portion of the reactant stays within the second conduit 250' while another portion of the reactant passes through the apertures 272 and into the space between the second conduit 250' and the dosing conduit 222. In certain implementations, at least some of the reactant passing through the apertures 272 impacts on an inner surface of the dosing conduit 222 or the end cap 228. By having some of the reactant impact on the second conduit 250' while a remainder of the reactant impacts on the dosing conduit 222, the liquid pooling within the second conduit 250' is reduced. Reducing the liquid pooling mitigates deposit formation within the second conduit 250'. In some examples, the apertures 272 are sized arranged so that a majority of the reactant impacts on an inner surface of the second conduit 250'. In other examples, the apertures 272 are sized arranged so that a majority of the reactant passes through the apertures 272.

In certain implementations, the space between the perforated section 270 of the second conduit 250' and the dosing conduit 222 keeps the perforated section 270 heated relative to ambient air. Further, the perforated section 270 of the second conduit 250' is exposed on both sides to hot exhaust. Accordingly, the surface temperature where the reactant impacts the perforated section 270 is sufficiently high to further mitigate deposit formation (e.g., by promoting evaporation of the reactant). In certain example, the hot exhaust passing through the space between the second conduit 250' and the dosing conduit 222 also heats the interior surface of the dosing conduit 222, which mitigates deposit formation on the inner surface of the dosing conduit 222.

Figure 17:
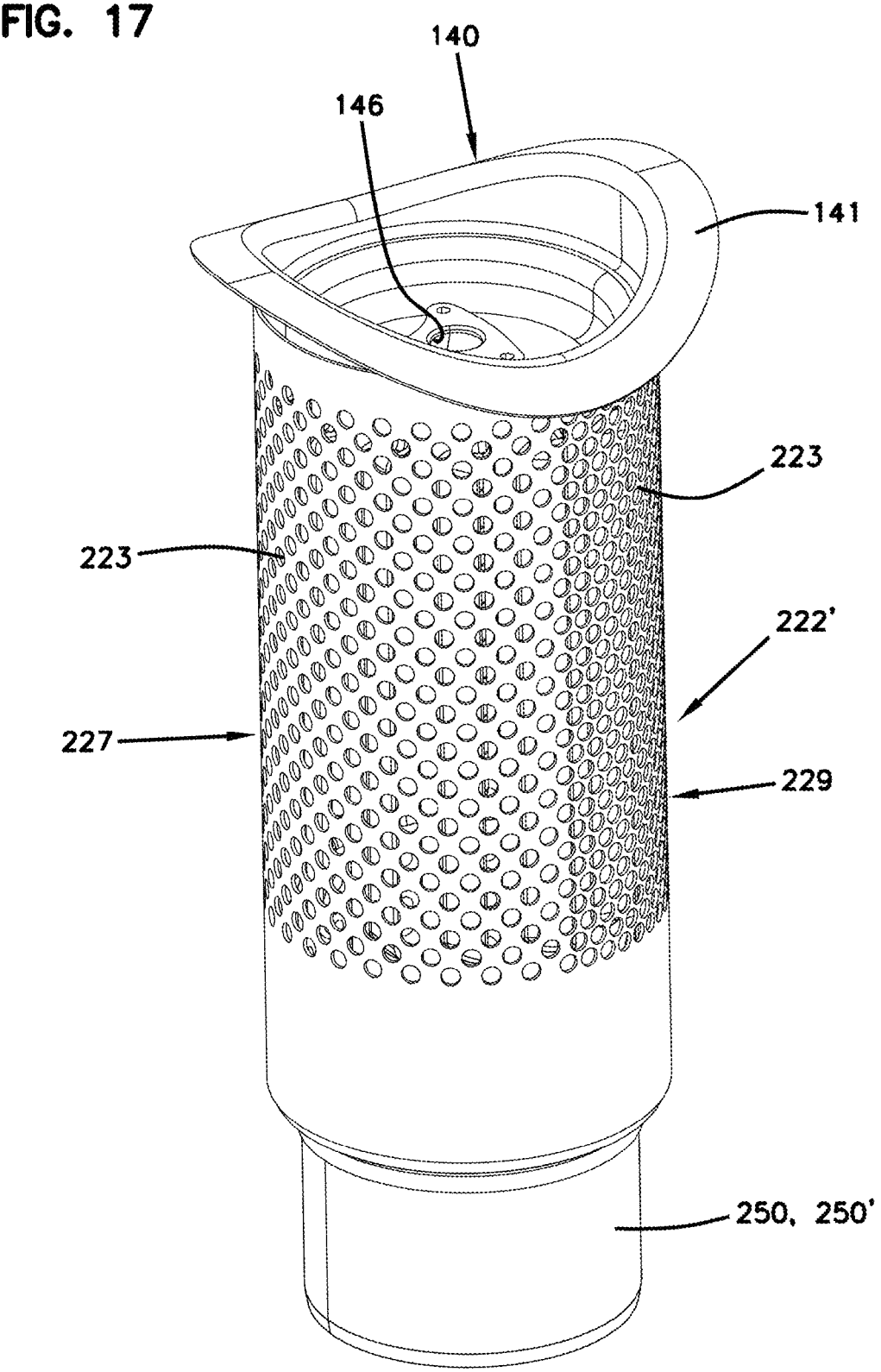
FIG. 17 is a perspective view of a mixer suitable for use with the aftertreatment device of FIG. 10, the mixer including a dosing conduit having a non-uniform perforated region.
Figure 18:
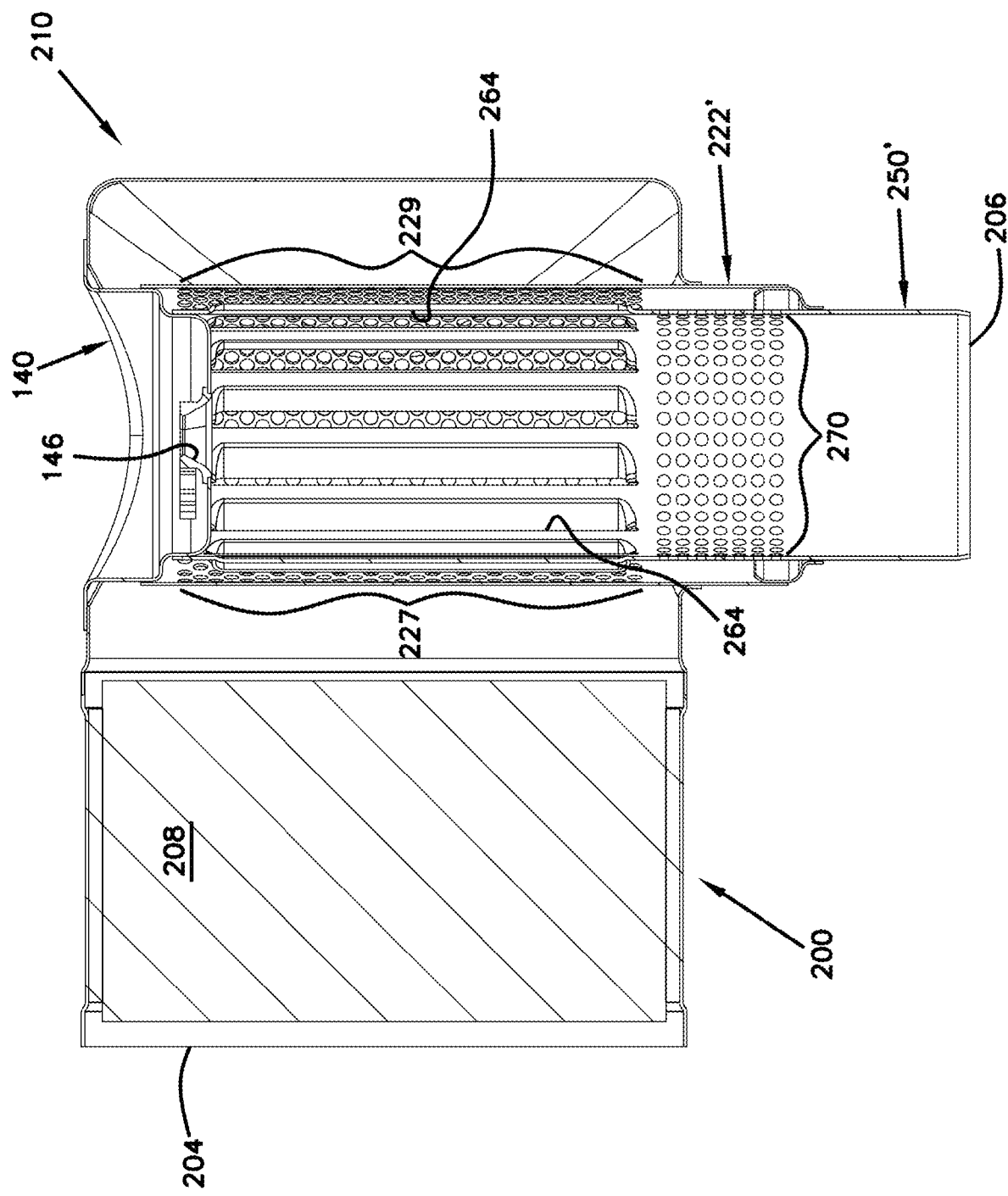
FIG. 18 is a cross-sectional view of the aftertreatment device of FIG. 10 shown with the louvered conduit of FIG. 15 and the dosing conduit of FIG. 17.

FIGS. 17 and 18 illustrate another variation on the mixing assembly 210 that utilizes an alternative embodiment, referred to herein using the designation 222', of the dosing conduit 222. The alternative dosing conduit 222' is substantially the same as the dosing conduit 222 except that the apertures 223 of the dosing conduit 222' along the perforated section P2 are non-uniform along the circumference of the dosing conduit 222'.

In some implementations, the dosing conduit 222' is disposed within the mixing assembly 210 to balance the passage of exhaust into the dosing conduit 222' along the circumference of the dosing conduit 222'. After passing through the inlet 204 and/or the first substrate 208, the exhaust reaches a first portion of the dosing conduit 222' facing the inlet 204 or first substrate 208. Some of the exhaust will pass through any apertures 223 disposed at the first portion and into the interior passage 225 of the dosing conduit 222'. A remainder of the exhaust will then flow around at least a portion of the exterior of the dosing conduit 222' before passing through the apertures 223 and into the interior passage 225. The apertures 223 are distributed around the dosing conduit 222' to balance the amount of flow that enters the interior passage 225 at each circumferential location.

For example, in certain implementations, the dosing conduit 222' is oriented so that the a portion of the dosing conduit 222' that initially receives the exhaust flow will have a smaller flow passage space defined by the apertures 223 as compared to the rest of the dosing conduit 222'. The size of the flow passage space at a particular location depends on the size, number, and density of the apertures 223 at the location. In the example shown, the perforated section P2 has a first group 227 of apertures 223 disposed at a first section of the circumference and a second group 229 of apertures 223 disposed at a second section of the circumference. In certain examples, the first group 227 of apertures 223 faces the inlet 204 or first substrate 208 while the second group 229 faces away from the inlet 204 or first substrate 208. In certain examples, the apertures 223 of the second group 229 allows more exhaust to pass therethrough than the apertures 223 of the first group 227. In certain examples, the apertures 223 in the second group 229 have a greater density than the apertures 223 of the first group 227. In certain examples, the apertures 223 in the second group 229 are larger than the apertures 223 of the first group 227. In certain examples, second group 229 has more apertures 223 than the first group 227.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

Aspects of the Invention

Aspect 1. An exhaust aftertreatment system for treating exhaust from an engine, the exhaust aftertreatment system comprising:
 an exhaust flow conduit through which the exhaust flows, the exhaust flow conduit having a longitudinal axis;
 a doser mounting unit disposed along the exhaust flow conduit;
 a dosing conduit disposed within the exhaust flow conduit, the dosing conduit defining a passage extending along a first axis that is angled relative to the longitudinal axis of the exhaust flow conduit, the first axis intersecting the doser mounting unit, the dosing conduit defining a perforated region; and
 a plurality of flow guides disposed within the dosing conduit, the flow guides being offset radially inwardly from an interior surface of the dosing conduit.

Aspect 2. The exhaust aftertreatment system of aspect 1, further comprising a downstream treatment substrate disposed downstream of the dosing conduit.

Aspect 3. The exhaust aftertreatment system of any of aspects 1-2, further comprising an upstream treatment substrate disposed upstream of the dosing conduit.

Aspect 4. The exhaust aftertreatment system of any of aspects 1-3, wherein the perforated region of the dosing conduit extends a first length along the first axis, and wherein each flow guide extends a second length along the first axis, the second length extending at least a majority of the first length.

Aspect 5. The exhaust aftertreatment system of any of aspects 1-3, wherein the perforated region of the dosing conduit extends a first length along the first axis, and wherein each flow guide extends a second length along the first axis, the second length extending less than a third of the first length.

Aspect 6. The exhaust aftertreatment system of any of aspects 1-3, wherein the flow guides include louvers on a second conduit disposed within the dosing conduit.

Aspect 7. The exhaust aftertreatment system of aspect 6, wherein the louvers extend outwardly from the second conduit towards the dosing conduit.

Aspect 8. The exhaust aftertreatment system of aspect 6, wherein the second conduit has a length extending along the first axis, the second conduit defining a louvered region at which the flow guides are disposed and a non-louvered region, the louvered region being disposed closer to the doser mounting location than the non-louvered region, the louvered region overlapping a majority of the perforated region of the dosing conduit.

Aspect 9. The exhaust aftertreatment system of aspect 6, wherein the second conduit is mechanically attached to the doser mounting unit.

Aspect 10. The exhaust aftertreatment system of any of aspects 1-3, wherein the flow guides are separate from each other.

Aspect 11. The exhaust aftertreatment system of aspect 10, wherein each flow guide includes a vane extending from a base end to a free end, the base end being connected to the doser mounting unit.

Aspect 12. The exhaust aftertreatment system of aspect 10, wherein each flow guide extends along no more than half of the perforated region.

Aspect 13. The exhaust aftertreatment system of any of aspects 1-12, wherein the flow guides are sufficiently short that a dosing spray zone does not intersect the flow guides.

Aspect 14. A method for treating exhaust using reactant injected from a nozzle of a doser, the method comprising:
 directing exhaust into a passage defined by a perforated conduit, the passage having a length extending from a first end of the perforated conduit to a second open end of the perforated conduit;
 spraying reactant from the nozzle into the passage from the first end of the perforated conduit, the reactant moving along the passage within a spray zone; and
 using a flow guide arrangement, inducing turbulence in at least a portion of the exhaust within an injecting region located at the nozzle, the injecting region extending along less than a third of the length of the passage, the flow guide arrangement not intersecting the spray zone.

Aspect 15. The method of aspect 14, wherein inducing turbulence in the at least a portion of the exhaust within the injecting region includes directing the portion of the exhaust through a ring of vanes surrounding the nozzle, each of the vanes being sufficiently short to not overlap the spray zone along which the reactant moves through the passage.

Aspect 16. The method of aspect 14, further comprising inducing turbulence in the exhaust exiting the perforated conduit, the turbulence of the exhaust exiting the perforated conduit being induced downstream from the injecting region.

Aspect 17. The method of aspect 14, wherein inducing turbulence comprises inducing swirling.

Aspect 18. A doser mounting unit for an exhaust aftertreatment device utilizing a doser to inject reactant into exhaust flowing through a conduit, the doser mounting unit comprising:
 a base configured to mount to the conduit through which the exhaust flows, the base defining an opening through which a nozzle of the doser extends; and
 a plurality of vanes extending from the base in a circumferential pattern around the opening, the vanes being carried with the base, the vanes each having a length extending from the base to a free end and each having a width extending between opposite first and second sides, the vanes being oriented so that the first side of each vane faces at least partially towards the opening and the second side faces at least partially away from the opening.

Aspect 19. The doser mounting unit of aspect 18, wherein the length of each vane is sufficiently short to be outside a spray zone of the reactant leaving the doser.

Aspect 20. The doser mounting unit of aspect 19, wherein the length of each vane is no more than 3 inches.

Aspect 21. The doser mounting unit of aspect 19, wherein the length of each vane is no more than 2.5 inches.

Aspect 22. The doser mounting unit of aspect 18, wherein the vanes are arranged to swirl exhaust passing through the vanes at an angular velocity of at least 5 meters per second.

Aspect 23. The doser mounting unit of aspect 18, wherein the vanes are arranged to swirl exhaust passing through the vanes at an angular velocity of at least 10 meters per second.

Aspect 24. The doser mounting unit of aspect 18, wherein the vanes are arranged to swirl exhaust passing through the vanes at an angular velocity of between 10-20 meters per second.

Aspect 25. An exhaust aftertreatment system for treating exhaust from an engine, the exhaust aftertreatment system comprising:
 an exhaust flow conduit through which the exhaust flows, the exhaust flow conduit having a longitudinal axis;
 a doser mounting unit disposed along the exhaust flow conduit;
 a dosing conduit disposed within the exhaust flow conduit, the dosing conduit defining a passage extending along a first axis that is angled relative to the longitudinal axis of the exhaust flow conduit, the first axis intersecting the doser mounting unit, the dosing conduit defining a perforated region; and
 a louvered conduit disposed within the dosing conduit, the louvered conduit being disposed between the dosing conduit and a dosing spray zone.

Aspect 26. The exhaust aftertreatment system of aspect 25, wherein the louvered conduit is coupled to the doser mounting unit.

Aspect 27. The exhaust aftertreatment system of any of aspects 25-26, wherein the dosing conduit extends from a first end to a second end, the first end being closer to the doser mounting unit, and wherein the louvered conduit extends beyond the second end of the dosing conduit.

Aspect 28. The exhaust aftertreatment system of aspect 27, wherein the second end of the dosing conduit closes against the louvered conduit.

Aspect 29. The exhaust aftertreatment system of any of aspects 25-29, wherein the louvered conduit includes louvers extending outwardly towards the dosing conduit.

Aspect 30. The exhaust aftertreatment system of aspect 29, wherein outer edges of the louvers are radially inwardly offset from the dosing conduit.

Aspect 31. An exhaust aftertreatment system for treating exhaust from an engine, the exhaust aftertreatment system comprising:
 an exhaust conduit through which the exhaust flows, the exhaust conduit having a longitudinal axis;
 a perforated conduit disposed within the exhaust conduit, the perforated conduit defining a passage extending along a first axis that extends at an angle relative to the longitudinal axis of the exhaust conduit, the perforated conduit having a length; and
 a doser mounting unit mounted to the exhaust conduit, the doser mounting unit defining an opening aligned with the passage of the perforated conduit, the doser mounting unit also including a plurality of flow guides extending into the passage of the perforated conduit, the flow guides being spaced inwardly from an inner surface of the perforated conduit, the flow guides having lengths extending along axes that are parallel to the first axis, the lengths of the flow guides being less than half of the length of the perforated conduit.

Aspect 32. The exhaust aftertreatment system of aspect 31, wherein the lengths of the flow guides is less than a third of the length of the perforated conduit.

Aspect 33. The exhaust aftertreatment system of aspect 31, wherein the lengths of the flow guides is less than a quarter of the length of the perforated conduit.

Aspect 34. The exhaust aftertreatment system of aspect 31, wherein the flow guides are oriented so that a first edge of each flow guide faces at least partially towards the inner surface of the perforated conduit and an opposite second edge of each glow guide faces at least partially towards a center of the passage.

Aspect 35. The exhaust aftertreatment system of aspect 31, further comprising a mixing arrangement disposed within the conduit, the mixing arrangement extending across the exhaust conduit to separate the exhaust conduit into a first region upstream of the mixing arrangement and a second region downstream of the mixing arrangement, the mixing arrangement including a deflection baffle defining an aperture through which exhaust flows to pass from the first region to the second region, the aperture aligned with the doser mounting unit and with the passage of the perforated conduit, the perforated conduit being disposed in the first region.

Aspect 36. The exhaust aftertreatment system of aspect 35, wherein the mixing arrangement is configured to swirl the exhaust passing through the aperture.

Aspect 37. The exhaust aftertreatment system of aspect 31, wherein the flow guides define a swirl region at the opening of the doser mounting unit, and wherein the flow guides are configured to swirl exhaust within the swirl region at a sufficient angular velocity to inhibit deposit formation within the swirl region.

Aspect 38. The exhaust aftertreatment system of aspect 37, wherein the swirl region extends along less than the length of the perforated conduit.

Aspect 39. The exhaust aftertreatment system of aspect 38, wherein the swirl region extends along less than half the length of the perforated conduit.

Aspect 40. The exhaust aftertreatment system of aspect 38, wherein the swirl region extends along less than a third the length of the perforated conduit.

What is claimed is:

1. An exhaust aftertreatment system for treating exhaust from an engine, the exhaust aftertreatment system comprising:
    an exhaust flow conduit through which the exhaust flows, the exhaust flow conduit having a longitudinal axis;
    a doser mounting unit disposed along the exhaust flow conduit;
    a dosing conduit disposed within the exhaust flow conduit, the dosing conduit defining a passage extending along a first axis that is angled relative to the longitudinal axis of the exhaust flow conduit, the first axis intersecting the doser mounting unit, the dosing conduit defining a perforated region; and
    a plurality of flow guides disposed within the dosing conduit in alignment with the perforated region, the flow guides being separate from the dosing conduit, the flow guides being offset radially inwardly from the dosing conduit.

2. The exhaust aftertreatment system of claim 1, further comprising a downstream treatment substrate disposed downstream of the dosing conduit.

3. The exhaust aftertreatment system of claim 1, further comprising an upstream treatment substrate disposed upstream of the dosing conduit.

4. The exhaust aftertreatment system of claim 1, wherein the perforated region of the dosing conduit extends a first length along the first axis, and wherein each flow guide extends a second length along the first axis, the second length extending at least a majority of the first length.

5. The exhaust aftertreatment system of claim 1, wherein the perforated region of the dosing conduit extends a first length along the first axis, and wherein each flow guide extends a second length along the first axis, the second length extending less than a third of the first length.

6. The exhaust aftertreatment system of claim 1, wherein the flow guides include louvers on a second conduit disposed within the dosing conduit.

7. The exhaust aftertreatment system of claim 6, wherein the louvers extend outwardly from the second conduit towards the dosing conduit.

8. The exhaust aftertreatment system of claim 6, wherein the second conduit has a length extending along the first axis, the second conduit defining a louvered region at which the flow guides are disposed and a non-louvered region, the louvered region being disposed closer to the doser mounting unit than the non-louvered region, the louvered region overlapping a majority of the perforated region of the dosing conduit.

9. The exhaust aftertreatment system of claim 6, wherein the second conduit is mechanically attached to the doser mounting unit.

10. The exhaust aftertreatment system of claim 1, wherein the flow guides are separate from each other.

11. The exhaust aftertreatment system of claim 10, wherein each flow guide includes a vane extending from a base end to a free end, the base end being connected to the doser mounting unit.

12. The exhaust aftertreatment system of claim 10, wherein each flow guide extends along no more than half of the perforated region.

13. The exhaust aftertreatment system of claim 1, wherein the flow guides are sufficiently short that a dosing spray zone does not intersect the flow guides.

14. A method for treating exhaust using reactant injected from a nozzle of a doser, the method comprising:
    directing exhaust into a passage defined by a perforated conduit, the passage having a length extending from a first end of the perforated conduit to a second open end of the perforated conduit;
    spraying reactant from the nozzle into the passage from the first end of the perforated conduit, the reactant moving along the passage within a spray zone; and
    using a flow guide arrangement, inducing turbulence in at least a portion of the exhaust within an injecting region located at the nozzle, the injecting region extending along less than a third of the length of the passage, the flow guide arrangement not intersecting the spray zone.

15. The method of claim 14, wherein inducing turbulence in the at least a portion of the exhaust within the injecting region includes directing the portion of the exhaust through a ring of vanes surrounding the nozzle, each of the vanes being sufficiently short to not overlap the spray zone along which the reactant moves through the passage.

16. The method of claim 14, further comprising inducing turbulence in the exhaust exiting the perforated conduit, the turbulence of the exhaust exiting the perforated conduit being induced downstream from the injecting region.

17. The method of claim 14, wherein inducing turbulence comprises inducing swirling.

18. A doser mounting unit for an exhaust aftertreatment device utilizing a doser to inject reactant into exhaust flowing through a conduit, the doser mounting unit comprising:
    a base configured to mount to the conduit through which the exhaust flows, the base defining an opening through which a nozzle of the doser extends; and
    a plurality of vanes extending from the base in a circumferential pattern around the opening, the vanes being carried with the base, the vanes each having a length extending from the base to a free end and each having a width extending between opposite first and second sides, the vanes being oriented so that the first side of each vane faces at least partially towards the opening and the second side faces at least partially away from the opening.

19. The doser mounting unit of claim 18, wherein the length of each vane is sufficiently short to be outside a spray zone of the reactant leaving the doser.

20. The doser mounting unit of claim 18, wherein the vanes are arranged to swirl exhaust passing through the vanes at an angular velocity of between 10-20 meters per second.

\* \* \* \* \*